US008384672B2

(12) United States Patent
Sakai et al.

(10) Patent No.: US 8,384,672 B2
(45) Date of Patent: *Feb. 26, 2013

(54) REMOTE CONTROL SYSTEM HAVING A TOUCH SCREEN

(75) Inventors: Ryutaro Sakai, Marina del Rey, CA (US); Isamu Arie, Santa Monica, CA (US); Yuki Kubota, Santa Monica, CA (US); Kuninori Hyogo, Santa Monica, CA (US); Fumiya Matsuoka, Rancho Palos Verdes, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/285,360

(22) Filed: Oct. 31, 2011

(65) Prior Publication Data

US 2012/0044061 A1 Feb. 23, 2012

Related U.S. Application Data

(63) Continuation of application No. 11/278,248, filed on Mar. 31, 2006, now Pat. No. 8,054,294.

(51) Int. Cl.
*G09G 5/00* (2006.01)
(52) U.S. Cl. .......................... 345/169; 345/173; 348/734
(58) Field of Classification Search ............ 345/2.1–2.3, 345/169–173; 348/734
See application file for complete search history.

(56) References Cited

U.S. PATENT DOCUMENTS

| | | |
|---|---|---|
| 4,725,694 A | 2/1988 | Auer et al. |
| 4,800,423 A | 1/1989 | Appiano et al. |
| 5,027,279 A | 6/1991 | Gottlieb et al. |
| 5,410,326 A | 4/1995 | Goldstein |
| 5,450,079 A * | 9/1995 | Dunaway .................. 341/23 |
| 5,545,857 A | 8/1996 | Lee et al. |
| 5,578,999 A | 11/1996 | Matsuzawa et al. |
| 5,767,919 A | 6/1998 | Lee et al. |
| 5,956,025 A | 9/1999 | Goulden et al. |
| 6,437,836 B1 | 8/2002 | Huang et al. |
| 6,553,345 B1 | 4/2003 | Kuhn |
| 6,703,940 B1 | 3/2004 | Allen et al. |
| 6,741,684 B2 | 5/2004 | Kaars |
| 6,781,518 B1 | 8/2004 | Hayes et al. |
| 6,791,467 B1 | 9/2004 | Ben-Ze'ev |
| 6,965,394 B2 | 11/2005 | Gutta et al. |
| 6,978,424 B2 | 12/2005 | Safadi |
| 6,989,763 B2 | 1/2006 | Wall et al. |
| 7,360,232 B2 | 4/2008 | Mitchell |
| 8,054,294 B2 | 11/2011 | Sakai et al. |

(Continued)

OTHER PUBLICATIONS

UPSTO; Non-Final Office Action Corresponding to U.S. Appl. No. 11/278,248; Mailed Feb. 13, 2009; 15 Pages.

(Continued)

*Primary Examiner* — Chanh Nguyen
*Assistant Examiner* — Kwang-Su Yang
(74) *Attorney, Agent, or Firm* — Fitch, Even, Tabin & Flannery LLP

(57) ABSTRACT

The present embodiments provide systems and methods for use in remote controlling devices including consumer electronic devices. Some embodiments provide a remote control system that comprises a processor, a touch screen display coupled with and receiving display control signals from the display driver such that the touch screen display displays one of a plurality of control views with a fixed number of function buttons displayed in each of the plurality of control views, and a wireless transmitter coupled with the processor that wirelessly transmits function signals in response to a detection of a selection of one of the function buttons.

20 Claims, 21 Drawing Sheets

U.S. PATENT DOCUMENTS

| | | |
|---|---|---|
| 2001/0011992 A1 | 8/2001 | Juen et al. |
| 2001/0015719 A1 | 8/2001 | Van Ee et al. |
| 2002/0054028 A1 | 5/2002 | Uchida et al. |
| 2002/0059610 A1 | 5/2002 | Ellis |
| 2002/0093568 A1 | 7/2002 | Chumbley |
| 2002/0140803 A1 | 10/2002 | Gutta et al. |
| 2003/0002638 A1 | 1/2003 | Kaars |
| 2003/0025840 A1 | 2/2003 | Arling |
| 2003/0035074 A1 | 2/2003 | Dubil et al. |
| 2003/0035075 A1 | 2/2003 | Butler et al. |
| 2003/0071792 A1 | 4/2003 | Safadi |
| 2003/0156053 A1 | 8/2003 | Wall et al. |
| 2003/0236654 A1 | 12/2003 | Flynn et al. |
| 2004/0066308 A1 | 4/2004 | Sampsell |
| 2004/0113892 A1 | 6/2004 | Mears et al. |
| 2005/0183135 A1 | 8/2005 | Uchida et al. |
| 2005/0185102 A1 | 8/2005 | Fairhurst |
| 2005/0188401 A1 | 8/2005 | Uchida et al. |
| 2005/0188418 A1 | 8/2005 | Uchida et al. |
| 2005/0190277 A1 | 9/2005 | Juen et al. |
| 2005/0231649 A1 | 10/2005 | Arling |
| 2005/0235209 A1 | 10/2005 | Morita et al. |
| 2006/0020969 A1 | 1/2006 | Utsuki et al. |
| 2006/0044478 A1* | 3/2006 | Chen ............................ 348/734 |
| 2006/0054476 A1 | 3/2006 | Kubo et al. |
| 2006/0181515 A1 | 8/2006 | Fletcher et al. |
| 2006/0197753 A1 | 9/2006 | Hotelling |

OTHER PUBLICATIONS

UPSTO; Non-Final Office Action Corresponding to U.S. Appl. No. 11/278,248; Mailed Sep. 2, 2009; 17 Pages.

UPSTO; Non-Final Office Action Corresponding to U.S. Appl. No. 11/278,248; Mailed Mar. 19, 2010; 19 Pages.

UPSTO; Final Office Action Corresponding to U.S. Appl. No. 11/278,248; Mailed Aug. 30, 2010; 21 Pages.

UPSTO; Non-Final Office Action Corresponding to U.S. Appl. No. 11/278,248; Mailed Feb. 2, 2011; 24 Pages.

UPSTO; Examiner Interview Summary Corresponding to U.S. Appl. No. 11/278,248; Mailed Jul. 21, 2011; 1 Page.

UPSTO; Notice of Allowance Corresponding to U.S. Appl. No. 11/278,248; Mailed Jul. 21, 2011; 17 Pages.

* cited by examiner

REMOTE CONTROL SYSTEM HAVING A TOUCH SCREEN

This application is a continuation U.S. application Ser. No. 11/278,248, filed Mar. 31, 2006, by Sakai et al., entitled TOUCH SCREEN REMOTE CONTROL SYSTEM FOR USE IN CONTROLLING ONE OR MORE DEVICES, which is incorporated in its entirety herein by reference.

FIELD OF THE INVENTION

The present invention relates generally to remote controllers and more particularly to remote control systems controlling a plurality of devices.

BACKGROUND

Many households include multiple devices that can be controlled by remote control devices, such as televisions (TV), stereos and other such devices. As a result, a large number of households include multiple different remote controls to control the plurality of devices. These remote controls often have many buttons to implement the control over the associated remote device to be controlled.

There are universal remote controls on the market that allow a user to configure the universal remote control based on predefined programs to control two or more devices from a single remote control. These universal remote controls often also have many buttons to implement the control over the plurality of devices. Universal remotes, however, often fail to provide full control as could be obtained by the original remote control devices.

SUMMARY OF THE EMBODIMENT

The present invention advantageously addresses the needs above as well as other needs through the provision of systems, apparatuses and methods for use in remotely controlling a plurality of devices. Some embodiments provide a remote control system that comprises a processor, a display driver coupled with the processor, a touch screen display coupled with and receiving display control signals from the display driver such that the touch screen display displays one of a plurality of control views with a fixed number of function buttons displayed in each of the plurality of control views, a tactile screen cover extending over and covering the touch screen display through which selections of one or more of the function buttons is detected, and a wireless transmitter coupled with the processor that wirelessly transmits function signals in response to a detection of a selection of one of the function buttons.

Methods for use in providing control over remote devices are further provided. Some of these methods display a first control view comprising a fixed number of function buttons on a touch screen display with each function button being associated with one of a first plurality of control functions; identify a selection of one of the function buttons associated with a first control function; wirelessly transmit a first function signal corresponding to the selected one of the function buttons; wirelessly receive a first control signal; and display a second control view on the touch screen display in response to the first control signal, with the second control view comprising the fixed number of function buttons with each function button of the second control view being associated with a second plurality of control functions where a plurality of the second plurality of control functions are different than the first plurality of functions.

Still other embodiments provide apparatuses for use in remotely controlling devices. Some of these embodiments include means for displaying a first control view comprising a fixed number of function buttons on a touch screen display with each function button being associated with one of a first plurality of control functions; means for identifying a selection of one of the function buttons associated with a first control function; means for wirelessly transmitting a first function signal corresponding to the selected one of the function buttons; means for wirelessly receiving a first control signal; and means for displaying a second control view on the touch screen display in response to the first control signal, with the second control view comprising the fixed number of function buttons with each function button of the second control view being associated with a second plurality of control functions where a plurality of the second plurality of control functions are different than the first plurality of functions.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above needs are at least partially met through provisions of methods, apparatuses, and/or systems for use in providing remote control as described in the following detailed description, particularly when studied in conjunction with the drawings, wherein.

Figure 1:
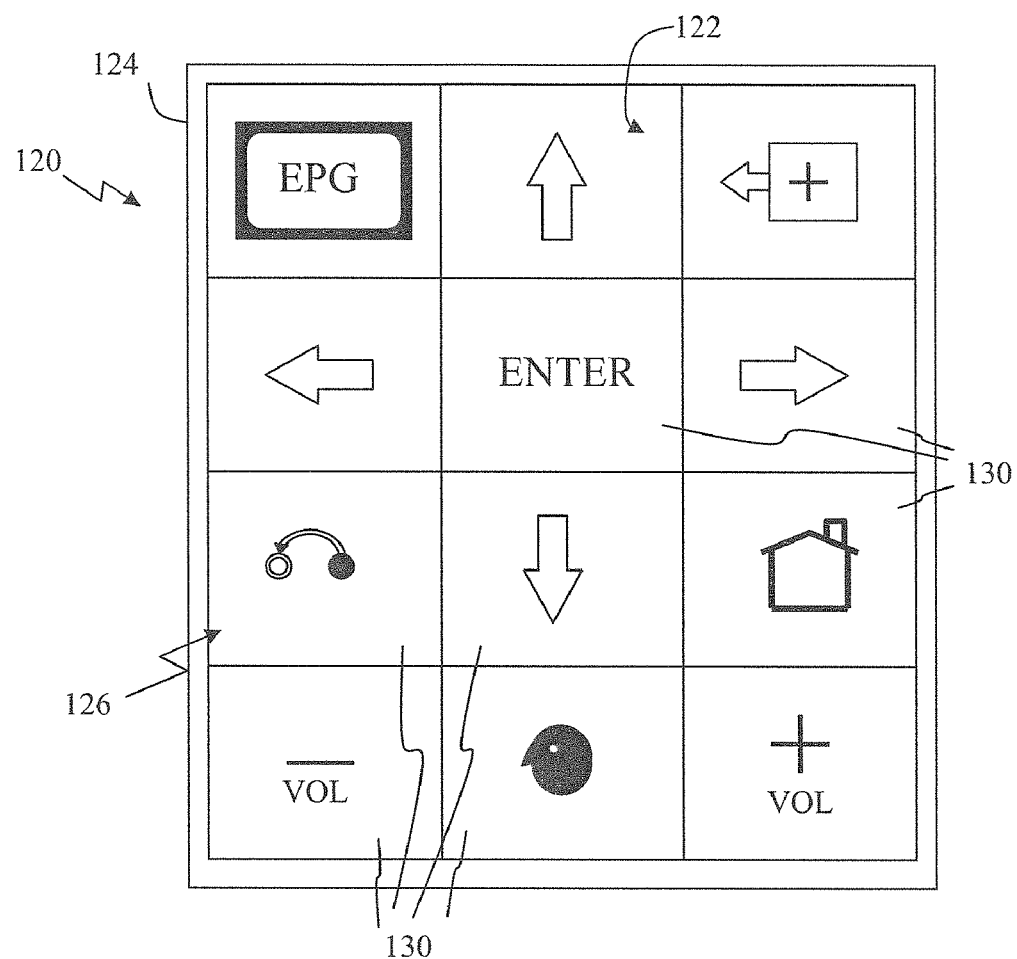
FIG. 1 depicts a simplified plane view of a remote control system or device according to some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiments provide systems, methods and apparatuses for use in remotely controlling one or more consumer electronic devices, such as televisions (TV), digital versatile disc (DVD) players, compact disc (CD) players, digital video recorders (DVR), amplifiers, receivers, video cassette recorders (VCR), and other consumer electronic devices. Enhanced control over one or more consumer products is provided, in part, by use of a touch screen display through which control or function buttons are displayed. As a result, the remote control device can alter the function buttons displayed to provide easier use of the remote control device and provide more relevant control functions.

Many homes and offices include multiple remote controls to control many different consumer electronic devices, such as multiple remote controls for TVs in the house, remote controls for DVD players, remote controls for amplifiers/stereos, and other such remote controls. As a result, users have to maintain the collection of remote controls and learn to use each remote control. Further, each remote control typically includes a large number of buttons to allow full control of the associated consumer electronic device. Further, many of the large numbers of buttons are rarely if ever used, and further clutter the remote control. There are some universal remote controls that can be programmed to control a limited plurality of consumer electronic devices. These universal remote controls, however, typically include a large number of buttons to allow the control of the various devices, and often cannot provide the full functionality of the remote control specific to the consumer electronic device to be controlled because of the limited size of the universal remote control. The large number of buttons can be confusing to users and can limit the effectiveness of the remote control because a user does not understand all of the buttons and/or cannot locate a desired button.

FIG. 1 depicts a simplified plane view of a remote control system or device 120 according to some embodiments. The remote control device 120 includes a touch screen display 122 and a casing 124. A control view 126 containing a fixed number of function or control buttons 130 is displayed on the touch screen 122. These function buttons allow a user to quickly and easily control one or more consumer electronic devices. Further, the displayed function buttons 130 change depending on the state of the one or more consumer electronic devices capable of being controlled through the remote control device 120. In some embodiments, one or more physical or hard buttons may be included, such as a power button or other such commonly accessed button.

Utilizing the touch screen 122 the remote control displays the fixed number of function buttons and changes the control view 126 and/or displayed function buttons depending on the state of operation of the remote control 120, a server unit as described below, and/or the consumer electronic device being controlled. Limiting the number of buttons on the touch screen 122 to the fixed number of buttons, in part, simplifies the use of the remote control 120 and allow for quick identification of desired button. Still further, the displayed function buttons 130 provide relevant buttons to the user and makes the remote control more user friendly. The fixed number of function buttons 130 can depend on that anticipated operation of the remote control and/or the device(s) to be controlled. In some embodiments, the fixed number of function buttons is limited to twelve (12) buttons that change depending on the state of operation.

The remote control device wirelessly communicates directly with one or more consumer electronic devices and/or with a server unit, such as an audio/video (AV) server unit, that interfaces with one or more consumer electronic devices to implement controls as directed by the remote control device 120. The wireless communication typically is a two-way communication so that the remote control device receives communications from the server unit and/or consumer electronic device as further described below.

In some embodiments, the remote control 120 further includes a protective cover, overlay, shield or film that protects the touch screen while still allowing the remote control to detect a user touching the touch screen 122. Additionally in some embodiments, the screen cover is a tactile cover that additionally provides tactile feedback to the user, such as through grooves, bevels, ridges, dividers, bumps, protrusions, and/or other such contouring on or in the screen cover.

Figure 2:
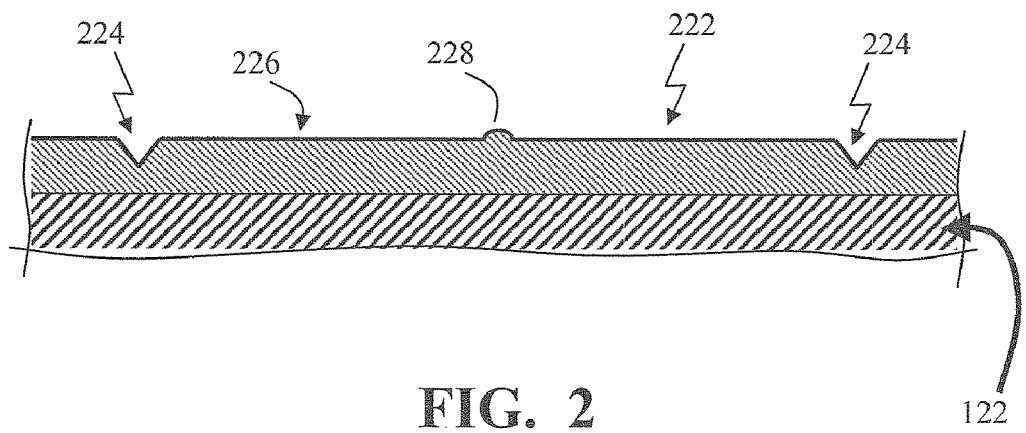
FIG. 2 depicts a simplified partial cross-sectional view of the touch screen and tactile screen cover of the remote control of FIG. 1 according to some embodiments.

FIG. 2 depicts a simplified partial cross-sectional view of the touch screen 122 and tactile screen cover 222 of the remote control 120 according to some embodiments. The tactile screen cover 222 is shown positioned over and covering the touch screen 122. The function buttons 130 (see FIG. 1) are selectable through the screen cover, where a user touches the screen cover over the function button desired and the remote control device 120 detects the selection on the touch screen. Further, the tactile screen cover 222 includes recesses, bevels, protruding lines or other tactile dividers 224 that extend across an exterior surface 226.

Referring to FIGS. 1-2, the tactile dividers 224 or other contours are typically configured to extend along the exterior surface 226 of the screen cover 222 and along boundaries of the fixed number of function buttons 130. As such, the tactile dividers 224 correspond with and identify boundaries of the function buttons allowing a user to accurately identify and select desired function buttons 130. The contouring further allows a user to identify function buttons without having to look at the touch screen. The tactile contours can include additional indications on the regions of the touch screen. For example, one or more raised or protruding circles, bumps or dots 228 can be included that protrude or extend from the exterior surface 226 correspond with a center point of one or more of the function buttons. The tactile screen cover 222 can be constructed of substantially any relevant material though which a selection can be detected at the touch screen 122, such as rubber, silicon, plastic, and other such materials or combinations of materials.

Figure 3:
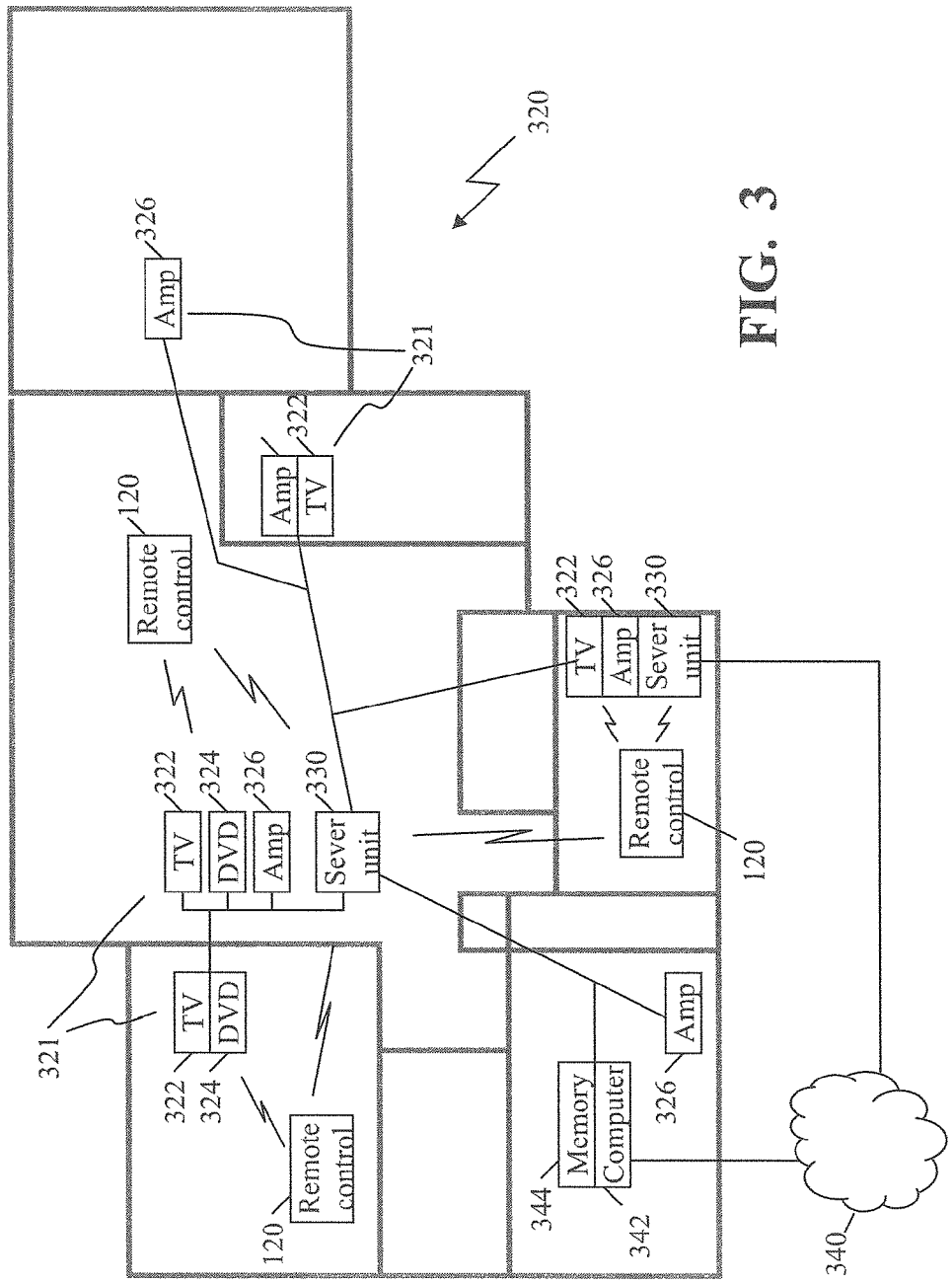
FIG. 3 depicts a simplified block diagram of a local home or office floor plan with a plurality of consumer electronic devices distributed through out the floor plan that can be controlled through one or more remote control devices of FIG. 1.

FIG. 3 depicts a simplified block diagram of a local home or office system or network 320 with a plurality of consumer electronic devices 321 distributed through out the floor plan that can be controlled through one or more remote control devices 120. For example, the home can include one or more TVs 322, DVD players 324, radios/tuners/amplifiers 326, CD players and other such consumer electronic devices. One or more server units 330 can also be included to interface between the remote control device(s) 120 and consumer electronic devices that do not have the capability of transmitting operating conditions and/or state information to the remote control device(s) 120.

Referring to FIGS. 1-3, the remote control device 120 wirelessly communicates with the one or more server units 330 and/or with the one or more consumer electronic devices 321 to determine states of operation of the server unit(s) 330 and consumer electronic devices, and control the operation of the consumer electronic devices. Further, the function buttons 130 displayed on touch screen 122 change depending on the consumer electronic device being controlled, the state of operation of the device being controlled, the state of operation of the server unit 330 and/or remote control device 120, and other factors as further described below.

In some implementations, a single remote control 120 can control consumer devices in multiple rooms of the house, office or other structure, either directly or through a server unit 330. The server unit can be hard wired and/or wirelessly coupled with multiple consumer devices to interface controls from the remote control 120 to the devices being controlled. In some instances, the server unit 330 can further be wired and/or wirelessly coupled with a distributed network 340, such as a local area network, a wide area network, intranets, public switching telephony network, the Internet, and/or other such networks. In some instances, the server unit can further be wired or wirelessly coupled with a computer or server 342 that provides access to the distributed network, and/or the server unit can be implemented on the computer 342. Additionally and/or alternatively, the server unit 330 or computer 342 can access additional local memory storage 344 or remote memory or servers over the distributed network 340. In some embodiments, the remote control 120 can further control at least part of the operation of the computer 342 similar to controlling other consumer electronic devices as further described below. The memory can be substantially any digital memory including, but not limited to, read only memory (ROM), random access memory (RAM), disc drives, flash memory, removable medium (e.g., floppy disc, hard disc, CD, DVD, Blu-ray, and the like), and substantially any other relevant memory or combinations of memory. Generically, the memory may also be referred to as a computer readable medium.

The displaying of the function buttons 130 on the touch screen 122 allows the remote control 120 to control substantially any number of different consumer electronic devices. In some embodiments, the server unit 330 determines the consumer electronic device to control based on the proximity of the consumer electronic devices to the remote control 120 during use. Upon selection of the type of consumer electronic device to be operated (e.g., TV, stereo, DVD player and the like), the server unit, in some implementations, identifies the selected type of device that is closest to the remote control 120 at the time of selection. Additionally and/or alternatively, the server unit can identify and have the remote control display on the touch screen 122 two or more consumer electronic devices allowing the user to select the desired consumer electronic device to control.

Figure 4:
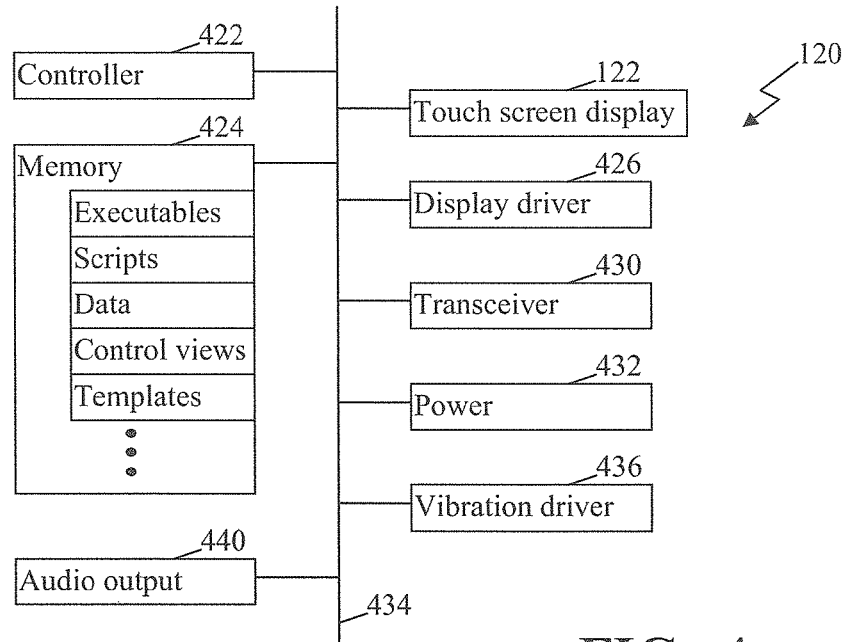
FIG. 4 depicts a simplified block diagram of the remote control of FIG. 1.

FIG. 4 depicts a simplified block diagram of the remote control 120 according to some implementations of some embodiments. The remote control includes a controller 422, memory 424, the touch screen display 122, a display driver 426, wireless transmitter and receiver and/or transceiver 430, a power source 432, and an internal communication network 434. The remote control 120 can, in some implementations, further include a vibration driver 436 that produces a tactile vibration through at least one or more portions of the touch screen 122, and/or an audio generator 440 that can generate an audible notice that a button has been selected, change of control views and/or other such notifications. Additionally and/or alternatively, the touch screen 122 can be configured to produce a click, flex or provide other tactile feedback that a button has been selected.

The controller 422 can be implemented through one or more processors, microprocessors and/or other such devices for providing overall functionality, data processing and/or implementing control over the remote control 120. The memory 424 stores software programs, executables, data, control programming, runtime parameters, operation conditions and parameters, control view(s), and/or templates, control functions, tables, other relevant programs and data, and/or instructions executable by a processor, machine or computer. The memory 424 can be implemented through ROM, RAM, disc drives, flash memory, removable medium (e.g., floppy disk, hard disc, CD, DVD and the like), and substantially any other relevant memory or combinations of memory. Generically, the memory 424 may also be referred to as a computer readable medium. The control provided through the remote control 120 may be implemented by software stored in the memory 424 and/or in the controller 422, and executed on a processor and/or stored and executed in firmware. Further, the controller 422 and/or processors implementing the controller 422 can be implemented through logic devices, hardware, firmware and/or combinations thereof. Thus, the controller 422 described herein may be implemented using substantially any relevant processor logic or logic circuitry. In some embodiments, the controller 422 is implemented through a mini-computer running software and/or firmware to implement the remote control functionality as described above and further below. The controller 422 can communicate with the other components of the remote control 120 over the communication link(s) 434, such as one or more buses. In some embodiments, the remote control is implemented at least in part through software that is updatable to allow the remote control to remain current and compatible with new devices and emerging technologies, allows for upgrades to improve operation and speed of operation, and the like.

The display driver 426 couples with the touch screen display 122 to drive the display and/or detect contact on the touch screen display 122 by a user. The optional vibration driver 436 can additionally be coupled with display driver and/or process. Upon detection of a selection of a function button 130, the vibration driver can be activated to cause a tactile vibration on the touch screen at least about the area of the selected function button that can be felt by the user as a confirmation of a function button selection. The wireless transceiver 430 transmits and receives wireless signals providing wireless communication between the remote control 120 and the one or more server units 330 and/or consumer devices 321, and can be implemented to provide substantially any relevant wireless communication, such as but not limited to, infrared (IR), radio frequency (RF), WiFi (e.g., 802.11g), Ethernet, BlueTooth, and other such wireless communication and/or combinations of wireless communication. The power source 432 can be battery, solar cell(s), and/or other such power source. In some embodiments, the remote control 120 cooperates with a cradle that supplies power and/or charges batteries of the remote control 120. The remote control can use power from cradle when operated in cradle or uses, for example rechargeable batteries when operated out of cradle.

Figure 5:
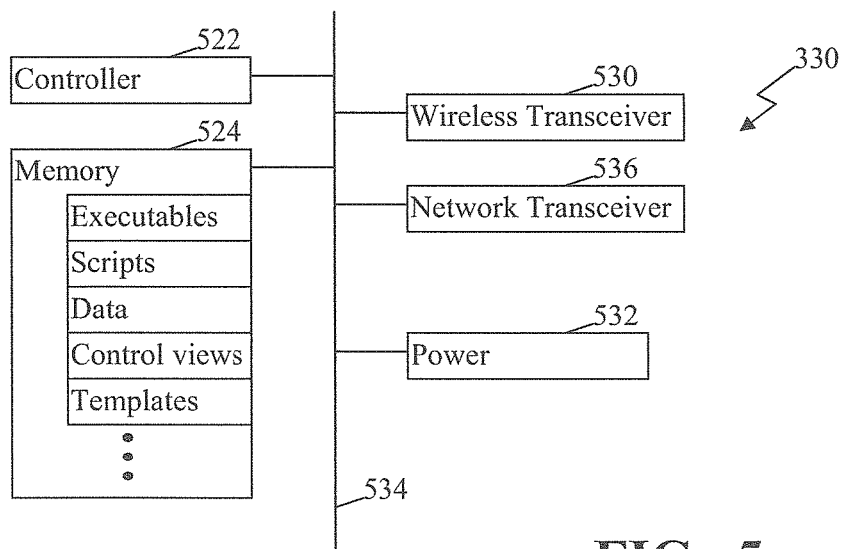
FIG. 5 depicts a simplified block diagram of the server unit of the network of FIG. 3 according to some implementations.

FIG. 5 depicts a simplified block diagram of the server unit 330 according to some implementations. The server unit includes a controller 522, memory 524, one or more wireless transmitters, receivers and/or transceivers 530, a power source 532, and an internal communication network 534. A network transceiver 536 can optionally be included in the server unit 330 to allow wired communication with one or more of the consumer electronic devices 321 and/or over the distributed network 340. The controller 522 can be implemented through one or more processors, computers, microprocessors and/or other such devices for providing overall functionality, data processing and/or implementing control over consumer devices 321. The memory 524 stores software programs, executables, data, control programming, runtime parameters, operation conditions and parameters, control views and/or templates, control functions, tables, other relevant programs and data, and/or instructions executable by a processor, machine or computer. The memory 524 can be implemented through ROM, RAM, disc drives, flash memory, removable medium (e.g., floppy disk, hard disc, CD, DVD and the like), and substantially any other relevant memory or combinations of memory. Generically, the memory 524 may also be referred to as a computer readable medium. The control provided through the server unit 330 may be implemented by software stored in the memory 524 and/or in the controller 522, and executed on a processor and/or stored and executed in firmware. The software can be updated to allow the server unit to remain current and compatible with new devices and emerging technologies, allows for upgrades to improve operation and speed of operation, and the like. Further, the controller 522 and/or processors implementing the controller 522 can be implemented through logic devices, hardware, firmware and/or combinations thereof. Thus, the controller 522 described herein may be implemented using substantially any relevant processor logic or logic circuitry. In some embodiments, the controller 422 is implemented through a processor or computer running software and/or firmware to implement the control functionality as described above and further below.

The wireless transceiver(s) 530 allows two-way communication between the server unit 330 and the remote control 120. Again as introduced above, the wireless communication can be implemented through substantially any relevant wireless communication including, but not limited to IR, RF and other such communications. The power source 532 can include a plug to connect with local AC power lines, battery and/or other such power source.

Referring back to FIGS. 1-3, multiple consumer electronic devices 321 can be controlled using a single remote control device 120. Further, a single remote control device can be carried from room to room to control different consumer electronic devices throughout a home or facility system 320. As introduced above, the remote control device 120 can communicate with one or more server units 330 and/or directly with consumer electronic devices to control the operation of the consumer electronic devices.

In operation, the remote control displays one of a plurality of different control views 126 each containing a fixed number of function buttons 130 on the touch screen 122 to allow a user to select one or more of the function buttons to implement control over the desired consumer electronic device. The control views 126 to be displayed on the touch screen 122 typically depends on the state of operation of the device being controlled, the state of the remote control 120 and/or the state of the server unit 330. Upon the detection of a selection by a user of one or more of the function buttons 130, the remote control wirelessly transmits one or more function signals associated with the selected function buttons to the server unit 330 and/or a consumer electronic device 321.

In some implementations, the remote control 120 controls a plurality of consumer electronic devices through the server unit 330, and when communication cannot be established with the server unit 330, may attempt to directly communicate with a desired consumer electronic device, for example, using IR based on a defined code for the device being controlled. The defined code may be identified upon a configuring of the remote control by selecting a code number that is pre-defined with the desired consumer electronic device.

The remote control device 120 further cooperates with a graphical user interface (OUI) menu displayed on a TV, computer display or other display. In some implementations, the server unit 330 communicates with the TV (or other display) providing display parameters such that the TV displays the GUI of the menu. Similarly, the server unit communicates with the remote control to control the displaying of control views 126 based on the state of the menu and the consumer device being controlled. The displayed control views 126 are associated with the menu and allow a user to navigate through the menu of the GUI. As a user makes selections of function buttons 130 on the touch screen 122, the remote control 120 transmits a selection function signal associated with the selected function button. The server unit determines how the selection is to be interpreted, and adjusts the menu displayed on the TV when appropriate and similarly returns one or more control signals to the remote control when the control view 126 is to change based on the selection. Typically, the control signals are wirelessly transmitted to a wireless receiver and/or transceiver 430 of the remote control.

Figure 6:
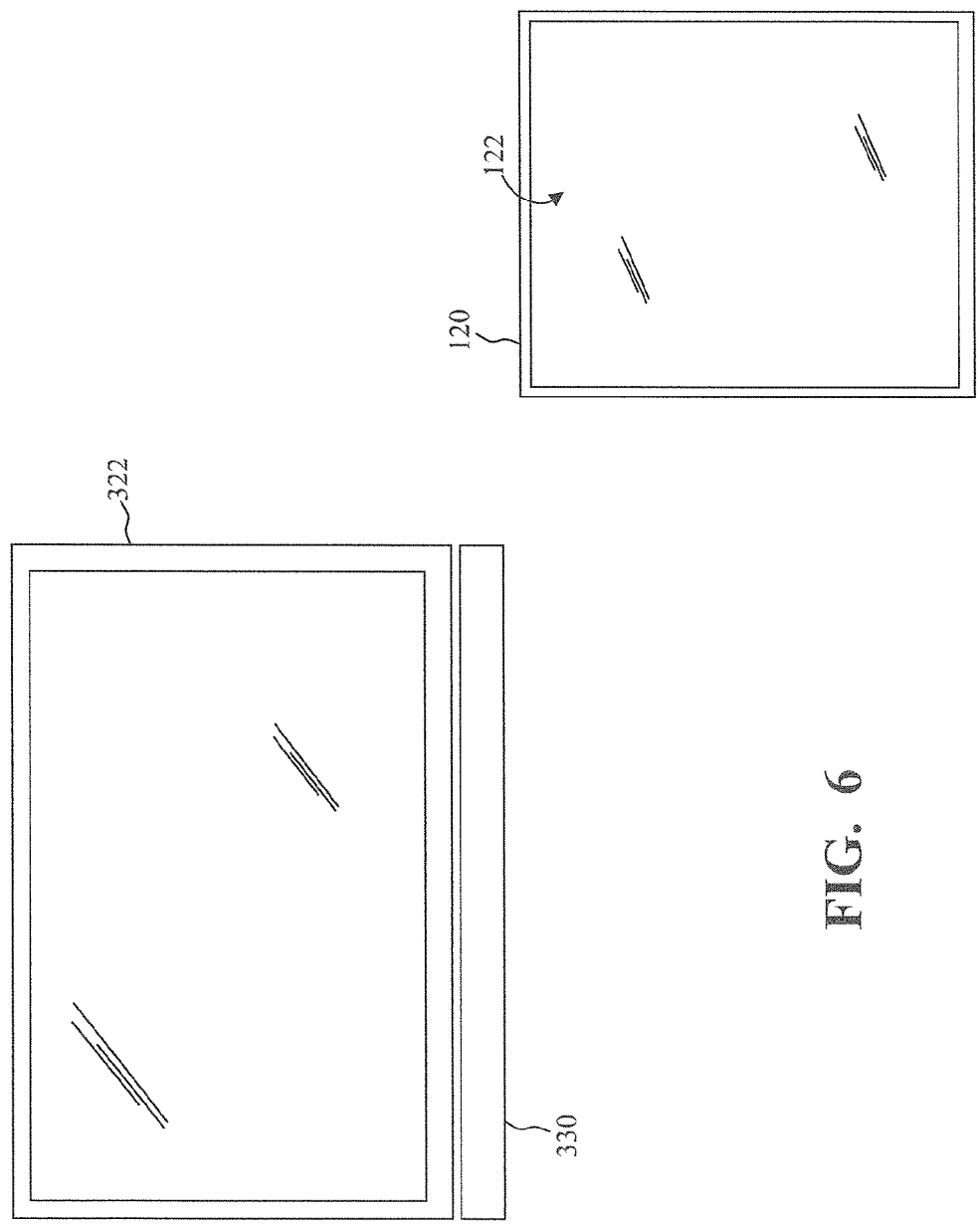
FIG. 6 depicts a simplified block diagram of a TV or other display coupled with a server unit, and a remote control in communication with the server unit.

FIG. 6 depicts a simplified block diagram of a TV or other display 322 coupled with a server unit 330, and a remote control 120 in communication with the server unit 330. Both the TV 322 and the remote control 120 are shown in an off or sleep state. The remote control 120 can be configured to enter a sleep state when the remote control has not been used within a threshold period of time, such that the touch screen 122 is turned off. To activate the touch screen, a user can touch the touch screen (through the tactile screen cover 222 when present), through the selection of a physical power button or other such activation. Upon detection of the activation, the remote control can activate the touch screen 122 to display a default control view, return to a control view in use at the time of power down, or other such control view. In some embodiments, the remote control 120 transmits an activation function signal to the server unit 330 that determines a state of the server unit, the TV or other consumer device being accessed or capable of been accessed, and the server unit can return to the remote control one or more commands, instructions and/or a control view that is to be used by the remote control.

Figure 7:
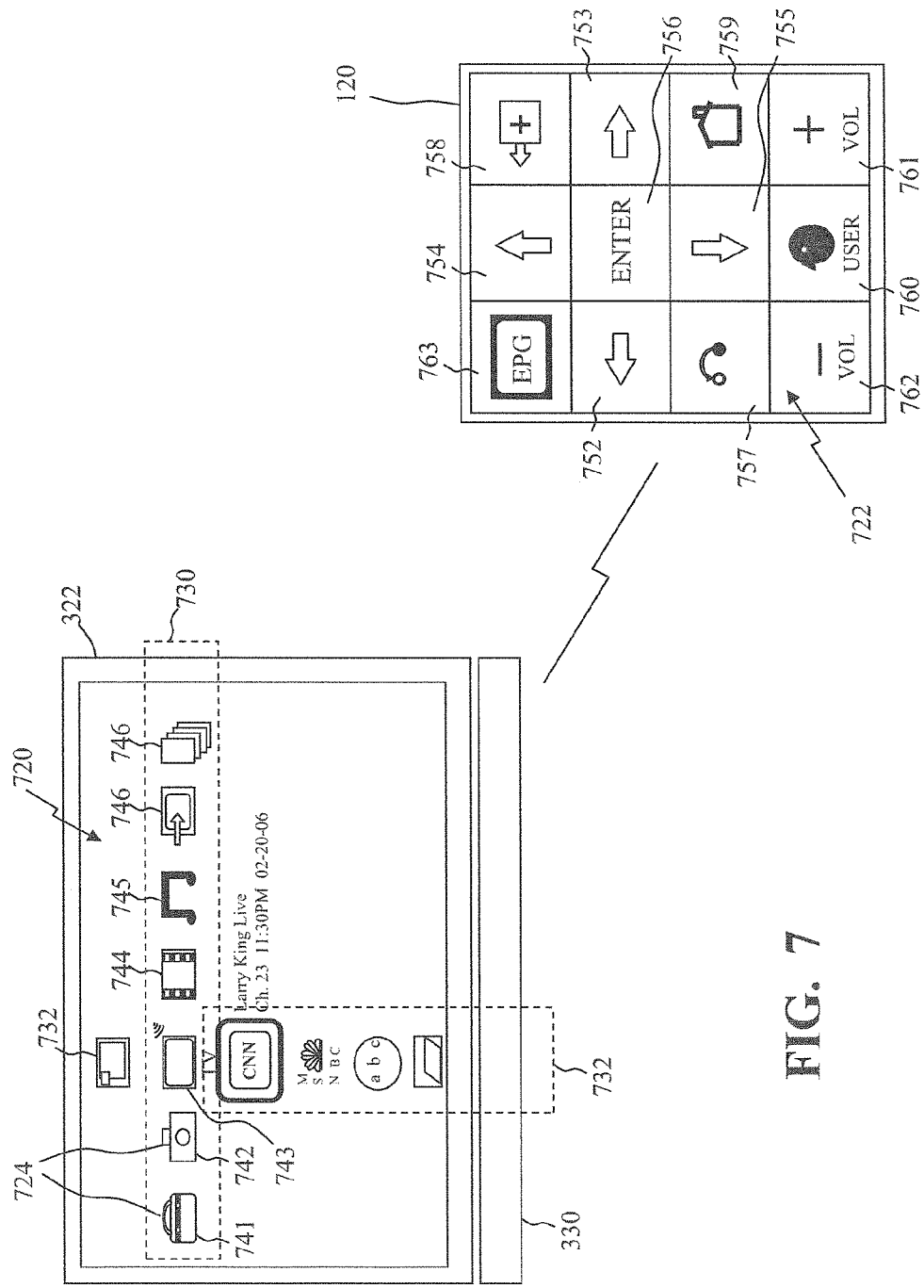
FIG. 7 depicts a simplified block diagram of TV or other display displaying a GUI menu and the remote control with a main control view that corresponds to the state of the menu.

FIG. 7 depicts a simplified block diagram of a TV or other display 322 displaying a GUI menu 720 and the remote control 120 with a menu control view 722 that corresponds to the state of the menu 720. The menu can be used by a user to coordinate and control the operation of one or more consumer electronic devices 321, according to some embodiment. The remote control 120 is used to move through or manipulate the menu 720 to control the desired consumer electronic device(s), such as the TV 322 displaying the menu 720. The menu 720 can be substantially any relevant menu displayed through a GUI allowing navigation and/or control over one or more devices. In some instances, the menu 720 includes selectable icons that allow a user to navigate through options and/or to initiate actions.

In some embodiments, the menu 720 is a Cross Media Bar (XMB) menu developed by Sony. The menu includes icons or graphics 724 representatives of control categories, devices capable of being controlled and/or other such functions and/or categories. Further, the menu 720 can include a main set 730 of icons extending across the display (shown in FIG. 7 extending horizontally). The main set of icons can include, for example, a settings or tools icon 741, a photo or graphics icon 742, a live TV icon 743, a movies icon 744, a music icon 745, a recorded TV programming icon 746, a history or log icon 747, and other such icons. Further, sub-sets of icons 732 can extend from one of the icons of the main set that is highlighted or selected.

The remote control 120 communicates with the server unit 330 to determine a control view to be display on the touch screen 122. The control view corresponds with the state of the menu 720 and includes function buttons 130 to control the navigation through the menu 720. For example, when the TV initially displays the menu 720 the remote control displays a menu control view 722 displaying menu navigation control function buttons. The function buttons can be assigned control functions such as directional controls or arrow buttons 752-755 for left, right, up and down navigation through the menu, a select or enter button 756, a back or return button 757, an option button 758, a menu button 759, a user function or log-in button 760, volume up and down control buttons 761-762, and an electronic programming guide (EPG) button 763.

The arrow buttons 752-755 cause the menu icons 724 to scroll over the screen sequentially highlighting icons as they scroll. In the example depicted in FIG. 7, the menu 720 is scrolled to highlight a live TV icon 743. The highlighting can be indicated by a bolding of the icon, an increasing of the size of the icon, the changing of the color of the icon, boxing the icon, underlining the icon or other such indications. Through the XMB menu the main icons are scrolled left and right such that the highlighted icon of the main icons is at a predefined fixed location or the same location further clarifying the highlighted icon. Upon highlighting and/or selecting a main icon, a sub-set of icons 732 can be displayed that similarly scroll over the display 322, such as scrolling up and down perpendicular to the main set of icons 730. In the example shown in FIG. 7, the sub-set of icons 732 identify potential channels that can be selected depending on the scrolling up and down.

The enter function button 756 causes a selection of a highlighted icon. The back function button 757 causes a reverse of the previously selected function button 130 or returns to a previous control view 126. The option button 758 causes one or more options associated with the highlighted icon to be displayed as further described below. The menu button 759 causes the menu 720 to be displayed or underplayed. The user log-in button 760 allows one or more users to be identified to configure the use of the remote control 120, server unit 330, and/or consumer device 321 to the logged in user. The electronic programming guide button 763 causes a listing or subsequent menu to be displayed showing available television channels, programming, start times and other relevant information. A single function button 130 can be associated with multiple different functions, for example, depending on the number of sequential times a button is selected and/or how long a button is selected or touched as further described below.

Figure 8:
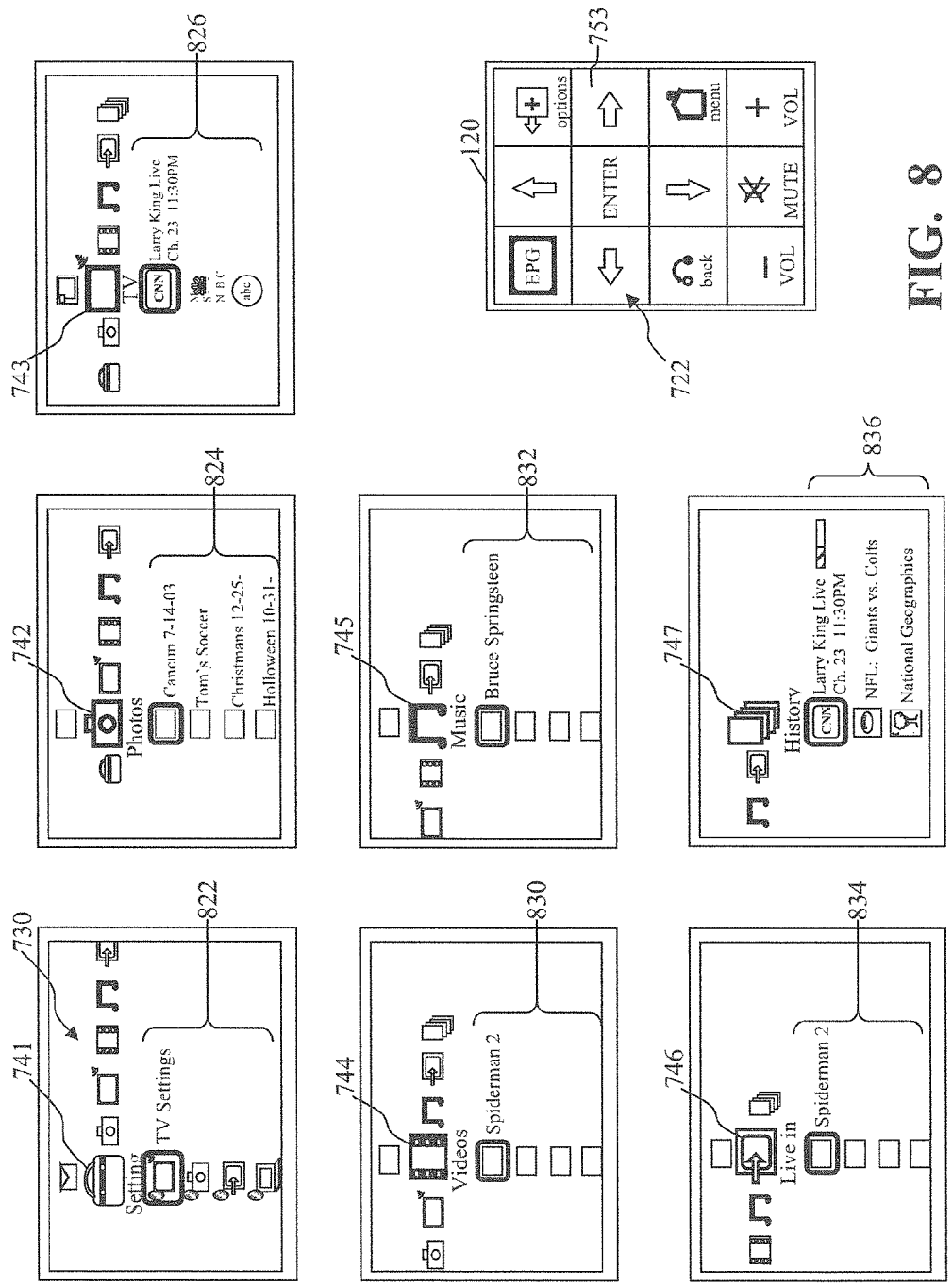
FIG. 8 depicts an example of a sequence of transitions through the main set of icons of the menu of FIG. 7 according to sequential selections of navigation or arrow buttons of the remote control of FIGS. 1 and 7.

The menu control view 722 allows a user to transition between icon options 724 to activate and/or control desired consumer electronic devices 321. FIG. 8 depicts an example of a sequence of transitions through the main set of icons 730 of the menu 720 of FIG. 7 according to sequential selections of the navigation or arrow buttons (e.g., arrow button 753) on the remote control 120. With the settings icon 741 highlighted, sub-icons 822 are displayed. The sub-icons can provide access to parameters and settings for TV operation, photo operation, recorded programming and the like, allowing a user to define parameters for the remote control 120, the system 320, the server unit 330 and/or other devices, define function button 130 operation(s), modify the remote control 120 and/or the control views to include user preferred buttons and other such modifications, define additional control views, and other such configuring of the remote control 120, consumer electronic device 321 being controlled, server unit 330 and/or the system 320. The sequential selection of the arrow button causes transitions from the setting icon 741 to the photo icon 742 with sub-icons 824 identifying individual and/or groups of photos or graphic; to the live TV icon 743 with sub-icons 826 of available TV programs; to the movies icon 744 with sub-icons 830 of available movies or groups of movies; to the music icon 745 with sub-icons 832 of playlists, albums, songs and the like; to the recorded TV programming icon 746 with sub-icons 834 of recorded programming content; and to the history icon 747 with sub-icons 836 of the most recently access media (such as most recently viewed TV program(s), song(s) access, etc.). Other main icons and/or sub-icons can be included depending on the system 320. The remote control 120 typically continues to display the same menu control view 722 with the fixed number of function buttons 130 while transitioning through the main icons 730. The control view typically transitions to an alternative view when a main icon or a sub-icon is selected, or other function buttons (e.g., the option button 758 or EPG button 763) is highlighted and/or selected.

Figure 9:
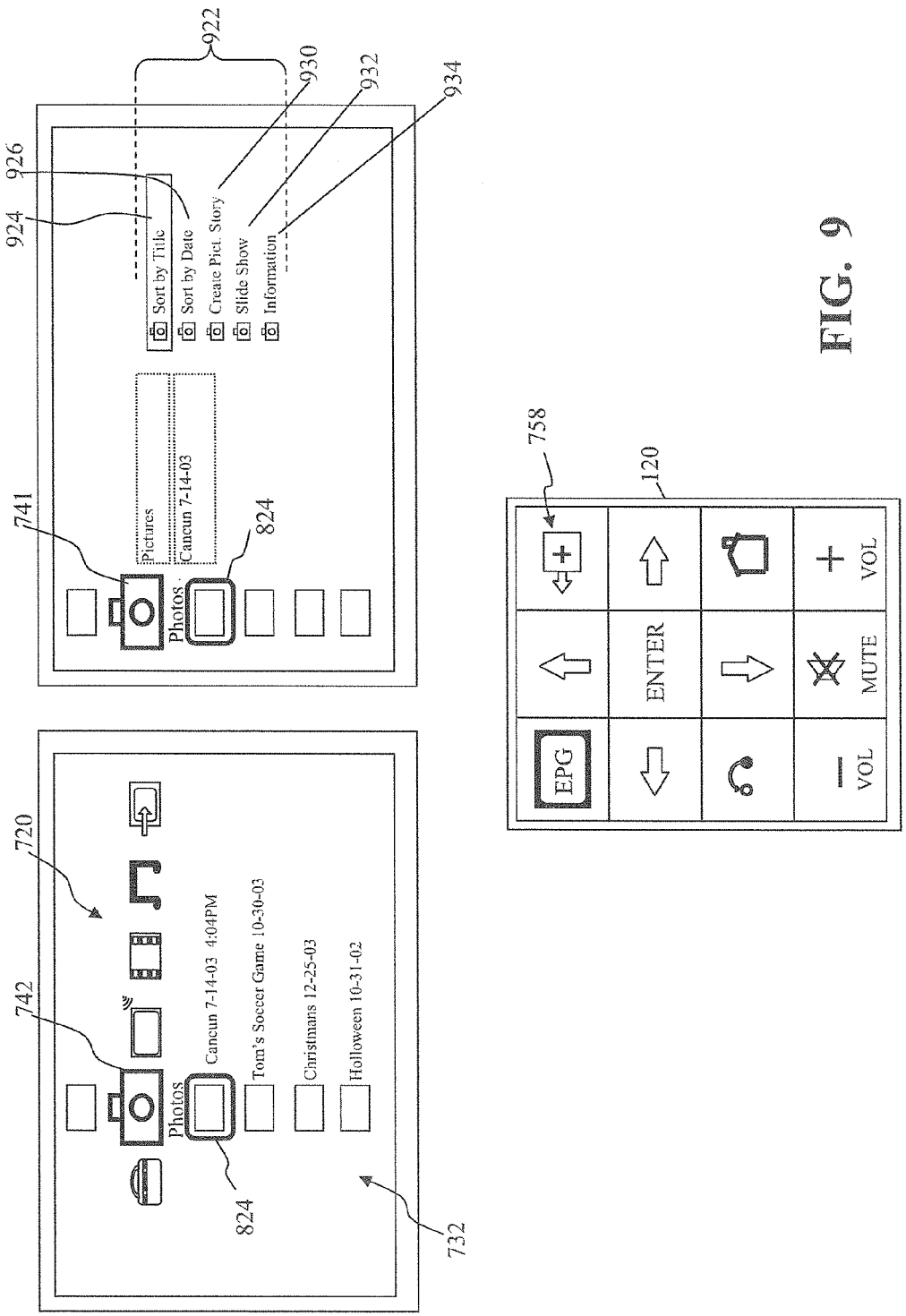
FIG. 9 depicts an example of a transition in the menu of FIG. 7 displayed upon the selection of an options button of the remote control while a sub-icon of the menu of FIG. 7 is highlighted.

FIG. 9 depicts an example of a transition in the menu display 720 upon the selection of the options button 758 while a sub-icon 732, such as a picture icon 824 under the photo button 742, is highlighted. Referring to FIGS. 8 and 9, upon the selection of the options icon 758, the remote control 120 detects the selection and identifies the function associated with the selected function button, and wirelessly transmits a function signal to the server unit 330 and/or consumer electronic device (e.g., TV) 321. Upon receipt of the function signal, the server unit determines a current state of operation for the consumer electronic device being controlled, determines an appropriate action to perform based on the function and activates the function. For example, when the TV is displaying the menu 720 and a picture icon 824 is highlighted, and an options function signal is received from the remote control 120 in response to a selection of the option button 758, the server unit identifies that the menu 720 is active, identifies the highlighted photo and identifies appropriate options 922 associated with the highlighted photograph and/or the available capabilities of the consumer electronic device (e.g., TV or computer) for displaying, editing and/or utilizing digital photographs are displayed, such as sorting by title 924, sorting by date 926, creating picture story 930, creating slide show 932, displaying information about the picture 934, and/or other such options.

Figure 10:
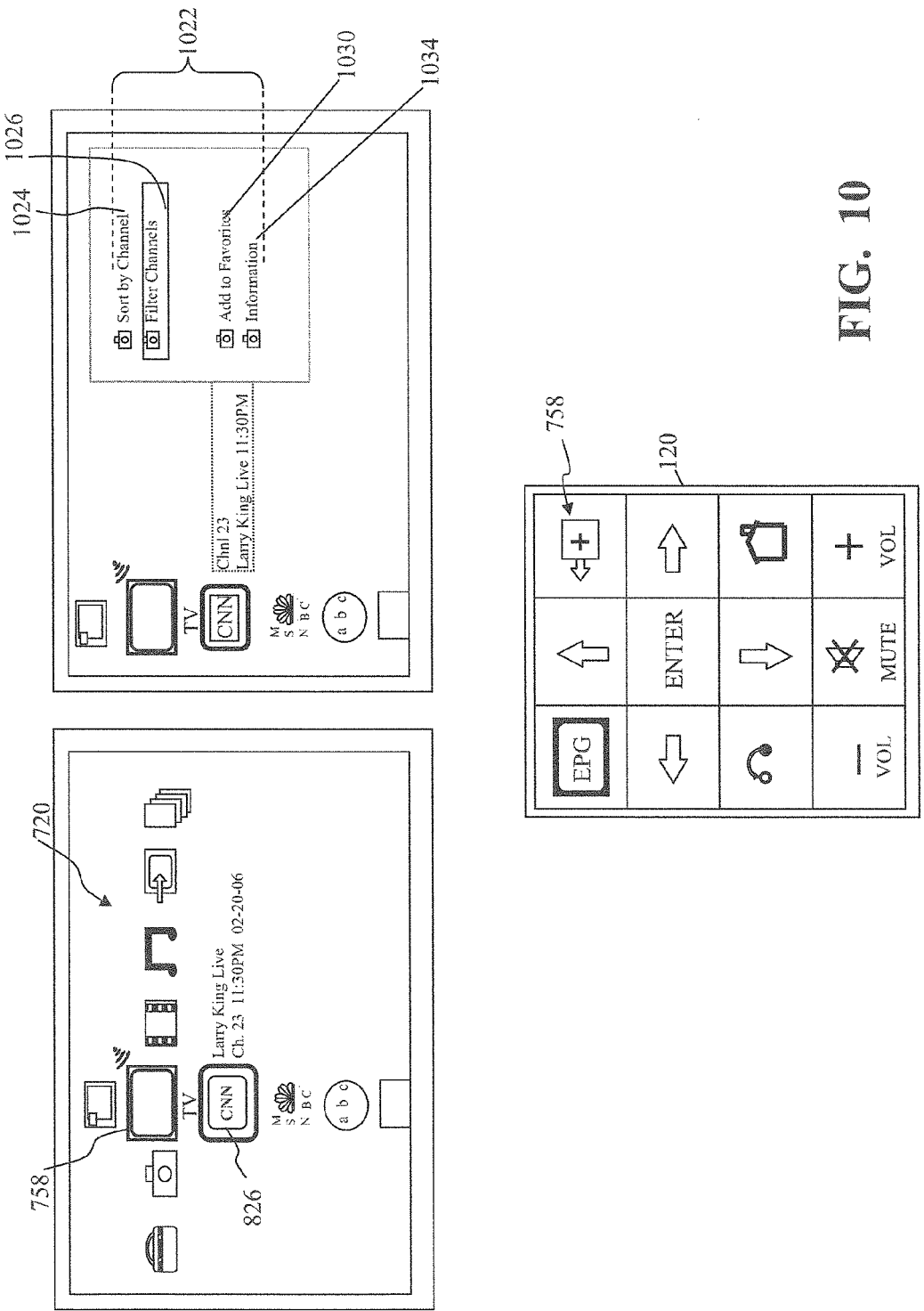
FIG. 10 depicts an example of a transition in the menu display of FIG. 7 upon the selection of an option button while a live TV sub-icon of the menu is highlighted.

Similarly, FIG. 10 depicts an example of a transition in the menu display 720 upon the selection of the option button 758 while a live TV sub-icon 826 is highlighted. The remote control 120 transmits the option function signal to the server unit 330 that identifies options associated with the currently highlighted or selected TV sub-icon 826 and directs the TV or computer to display and/or forwards options 1022 to be display. In some embodiments, the options are displayed over content being displayed (e.g., over a movie currently being played back), can be displayed over a menu screen (e.g., with currently accessed content being paused), or other display configurations. The options can include substantially any relevant option, such as sort channels 1024, filter channels 1026, add to favorites 1030, information 1032, and/or other such options. The arrow function buttons 752-755 of the remote control 120 allow a user to traverse through the options to identify an option to activate and/or utilize. Similarly, the back function button can be used to cause the server unit to return the displayed menu back to the main icon listings 730 and/or sub-icon listings 732.

The selection and initiation of playback of TV content, movie content, audio content and/or the access to other relevant content, data or information accessible through the consumer electronic devices 321 can similarly be accessed. For example, with the TV icon 743 highlighted and a plurality of available TV programs or channels 826 of the sub-menu 732 extending from the TV icon, a user can use the function buttons to select a TV program to be displayed on the TV 322. Upon selection of a TV program, the TV displays the program, and the server unit 330 instructs the remote control to display a playback control view 1120.

Figure 11:
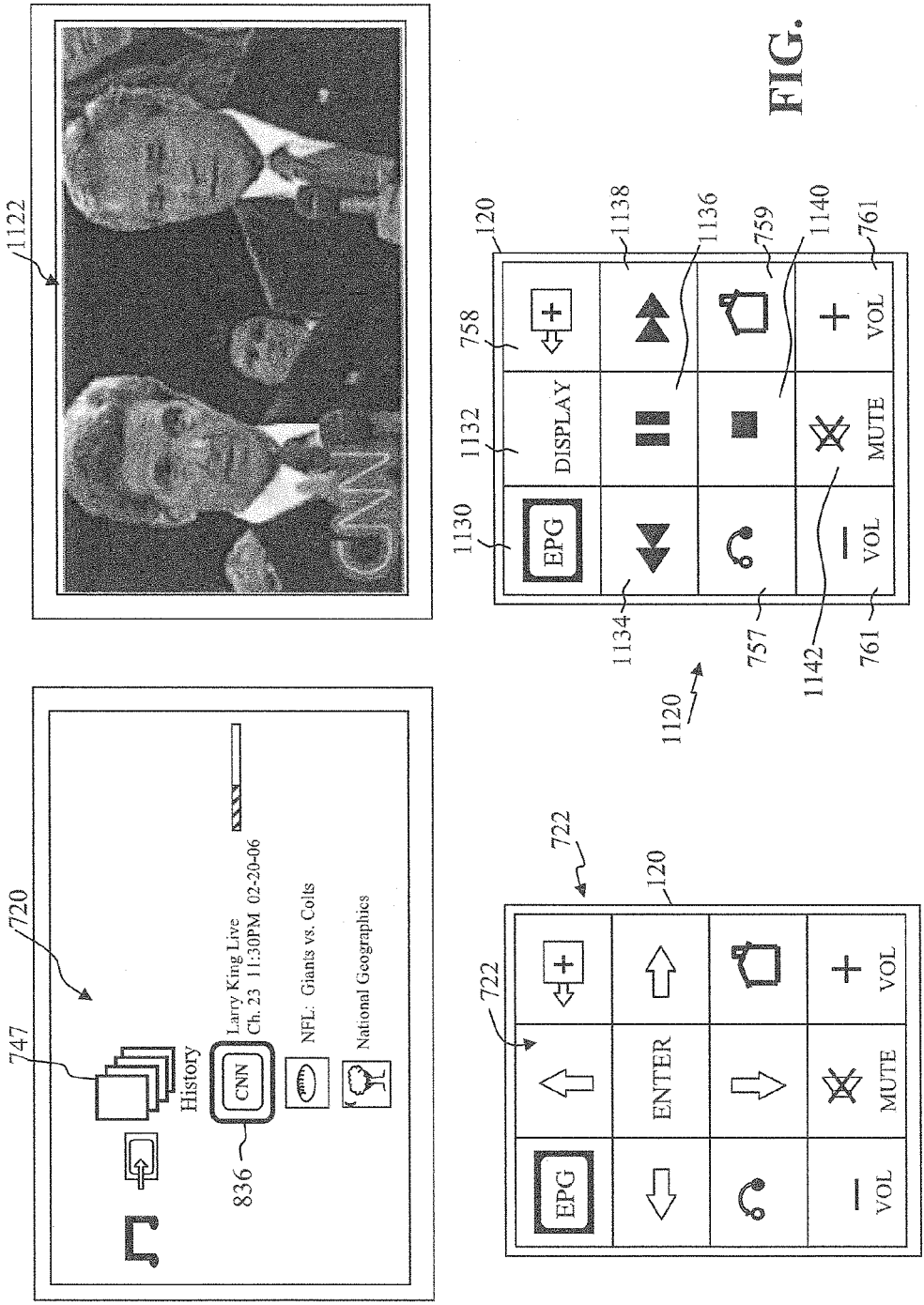
FIG. 11 depicts an example of a transition of function buttons on a touch screen of the remote control from a menu control view to a playback control view upon the selection of an icon from a listing of sub-icons of a displayed menu.

FIG. 11 depicts an example of a transition in the touch screen 122 from the menu control view 722 to a playback control view 1120 upon the selection of a TV program icon from the listing of sub-icons 836 associated with, for example, the history icon 747. Also shown in FIG. 11 is the transition from displaying the menu display 720 to the displaying of selected multimedia content 1122 for playback (in this example, a television program). A user utilizes the arrow buttons 752-755 of the menu control view 722 to navigate through the menu 720 to a desired icon and utilizes the displayed enter button 756 to initiate a selection of the desire content (in this example, the TV program).

The remote control 120 transmits the selection function signal to the server unit 330 and the server unit directs the TV to display the selected content. Further, the server unit communicates control signal(s) back to the remote control to transition to the playback control view 1120 in response to the selection.

The playback control view 1120 includes the twelve predefined number of function buttons 130 that are configured for use in controlling the playback of at least some content, such as TV program content, movie content (whether on a DVD, DVR or other such format), music content, DVR stored content, and other such content. The playback function buttons of the playback control view 1120 can include a guide or EPG button 1130, a display button 1132 that can cause the display of statistics of the content being played back (e.g., title, start time, run time, playback progress bar, and other such statistics), an options button 758, a rewind button 1134, a pause button 1136, a fast forward button 1138, a back button 757, a stop button 1140, a menu button 759, volume buttons 761-762 and a mute button 1142.

Figure 12:
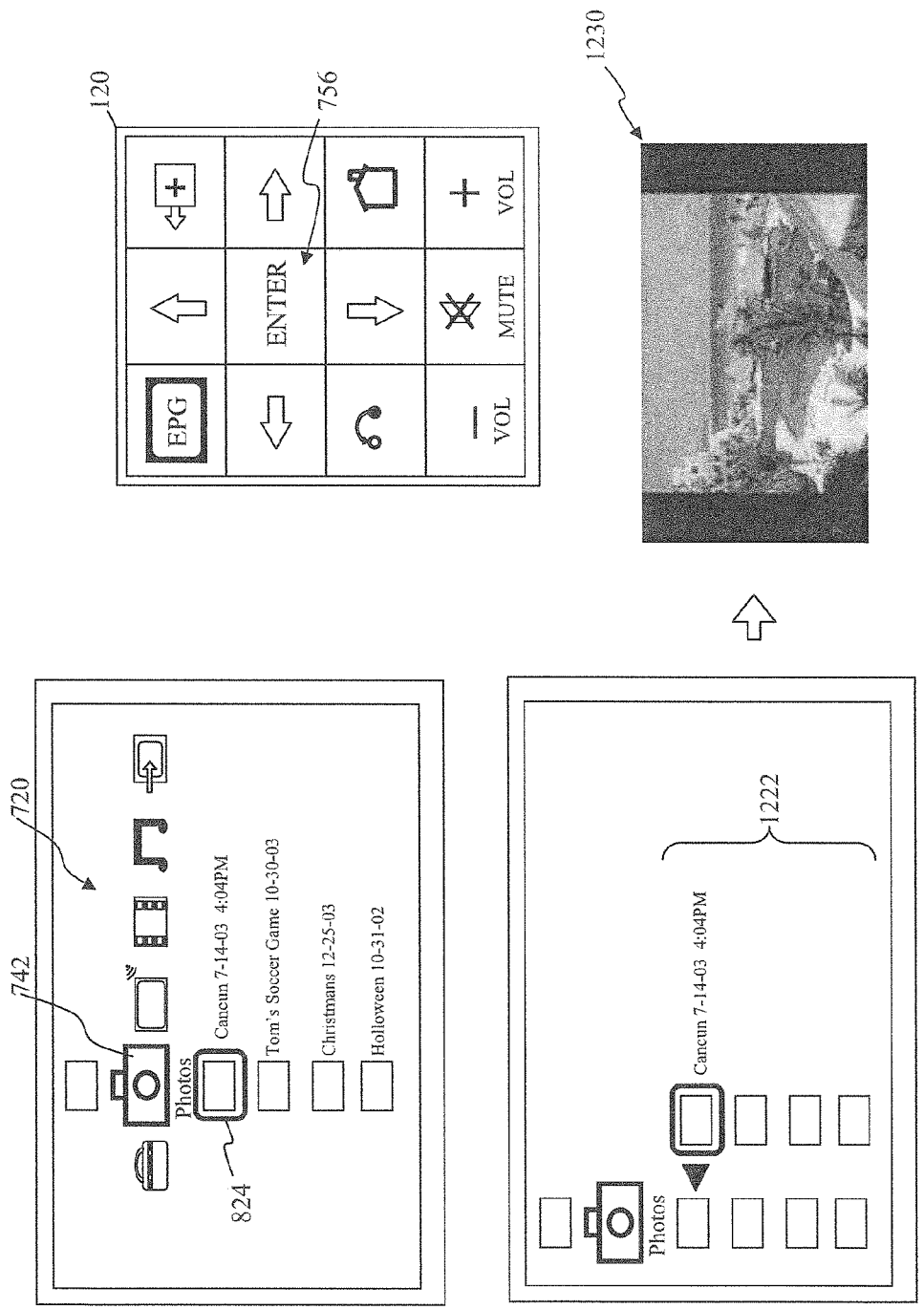
FIG. 12 depicts an example of a transition in the menu display of FIG. 7 upon the selection of a sub-icon of the menu.

FIG. 12 depicts an example of a transition in the menu display 720 upon the selection of a sub-icon 732, such as the selection of a highlighted picture grouping icon 824 under the photo icon 742. The remote control 120 detects the selection of the enter button 756 and communicates the enter function signal to the server unit 330. The server unit upon receipt of the enter function signal identifies the state of the system, i.e., the menu 720 is displayed with a picture grouping highlighted. Based on the state, the server unit instructs the TV to display a listing 1222 of pictures associated with the selected picture grouping 824.

Further in this example, when the remote control 120 detects the selection of one or more highlighted pictures of the listing of pictures 1222 (e.g., selection of the enter button 756), the remote control again transmits the enter function signal, and the server unit determines a state and instructs the TV to display and/or forwards the picture data to the TV to display 1230.

As introduced above, the function buttons 130 can be associated with multiple functions depending on a state of the server unit 330, the consumer electronic device being control, the state of the remote control 120, and other factors. For example, the option button 758 can cause the server unit 330 or consumer electronic device 321 to display options of the server unit and/or consumer electronic device instead of the options associated with a selected icon.

Figure 13:
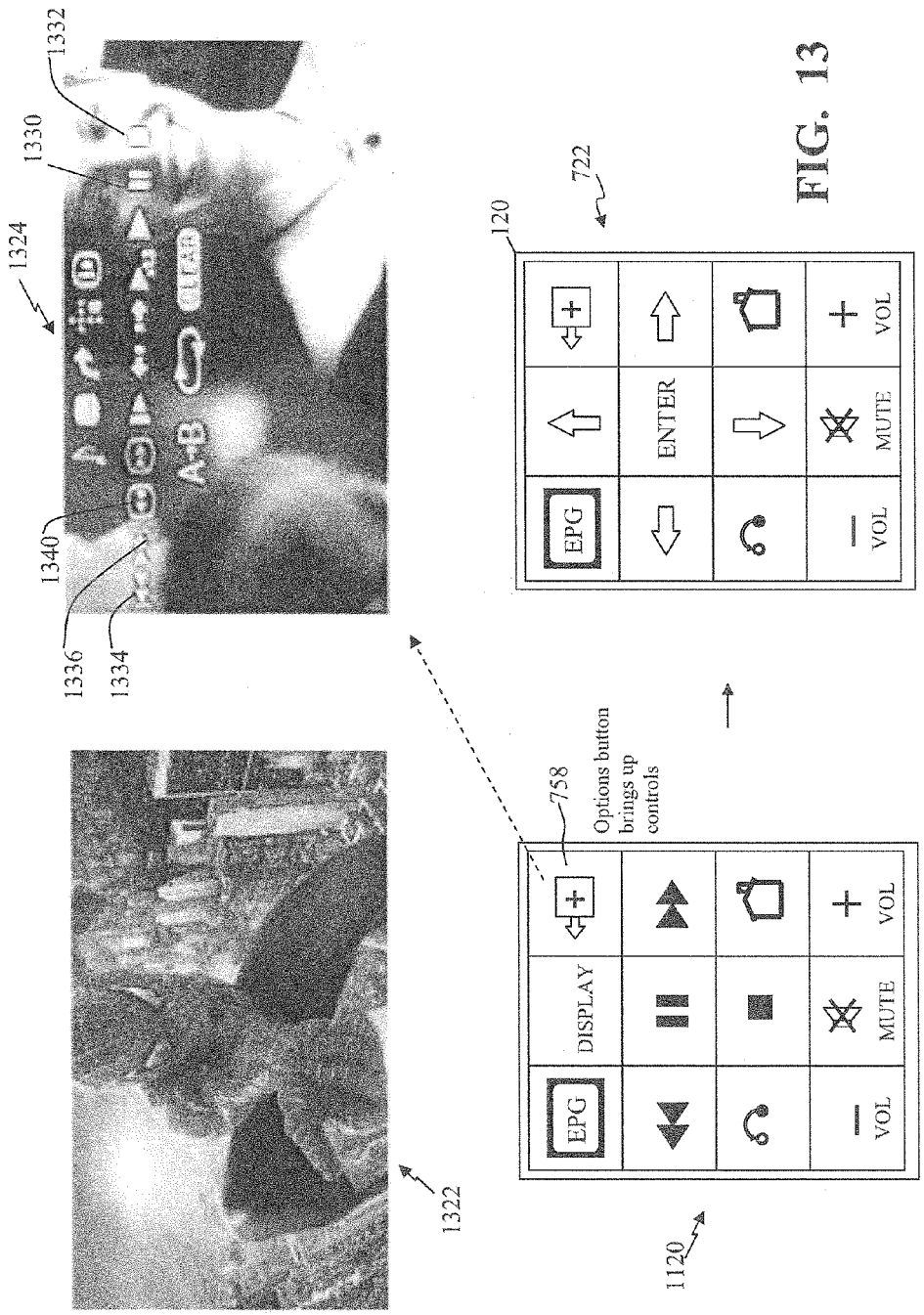
FIG. 13 depicts the remote control of FIG. 1 with a playback control view displayed on the touch screen, and an example of a transition from displaying content to the displaying of an options menu for the consumer electronic device being controlled upon the selection of a function button of the remote control.

FIG. 13 depicts the remote control 120 with the playback control view 1120 and an example of a transition from displaying content 1322 (e.g., a DVD player 324 playing back content that is displayed on the TV 322) to the displaying of an options menu 1324 for the consumer electronic device being controlled. As described above with reference to FIGS. 9-10, the selection of option button 758 when the state of the sever unit 330 is such that the menu 720 is displayed causes options associated with highlighted and/or selected icons 724 to be displayed. The option button 758 can, however, have multiple functions, including initiating alternate actions by the server unit 330 and/or consumer electronic devices depending on the state of operation of the server unit and/or consumer device.

Still referring to FIG. 13, in some implementations when the state of operation is such that content 1322 (e.g., DVD content) is being played back and the playback control view 1120 is displayed on the remote control touch screen 122, the selection of the option button during this state of operation causes the server unit, DVD player 324 and/or TV 322 to display the options menu 1324 providing options for the configuring and/or controlling of the DVD player playing back the content and/or the TV displaying the played back content. The options menu 1324 can, for example, include a plurality of options for the DVD player 324 and/or the playing back of content through the DVD content upon the selection of the options button 758 while the content 1322 is being played back. The options menu 1324 can include options such as pause 1330, stop 1332, skip backward 1334, skip forward 1336, adjusting the displayed content 1340 and other such relevant options. Similar options can be displayed for other devices being controlled upon selection of the option button 758 and the state of operation of the server unit 330, remote control 120 and/or the consumer electronic device being controlled. Further, the remote control 120 transitions to display the menu control view 722 or other similar control view (e.g., having cursor or arrow buttons 752-755) to allow a user to transition a cursor or highlight indicator through the options of the option menu 1324 and/or to select one or more of the options of the option menu 1324.

Other function buttons 130 can be associated with multiple different functions depending on the state of operation of the server unit 330, remote control 120 and/or the consumer electronic device being controlled.

Figure 14:
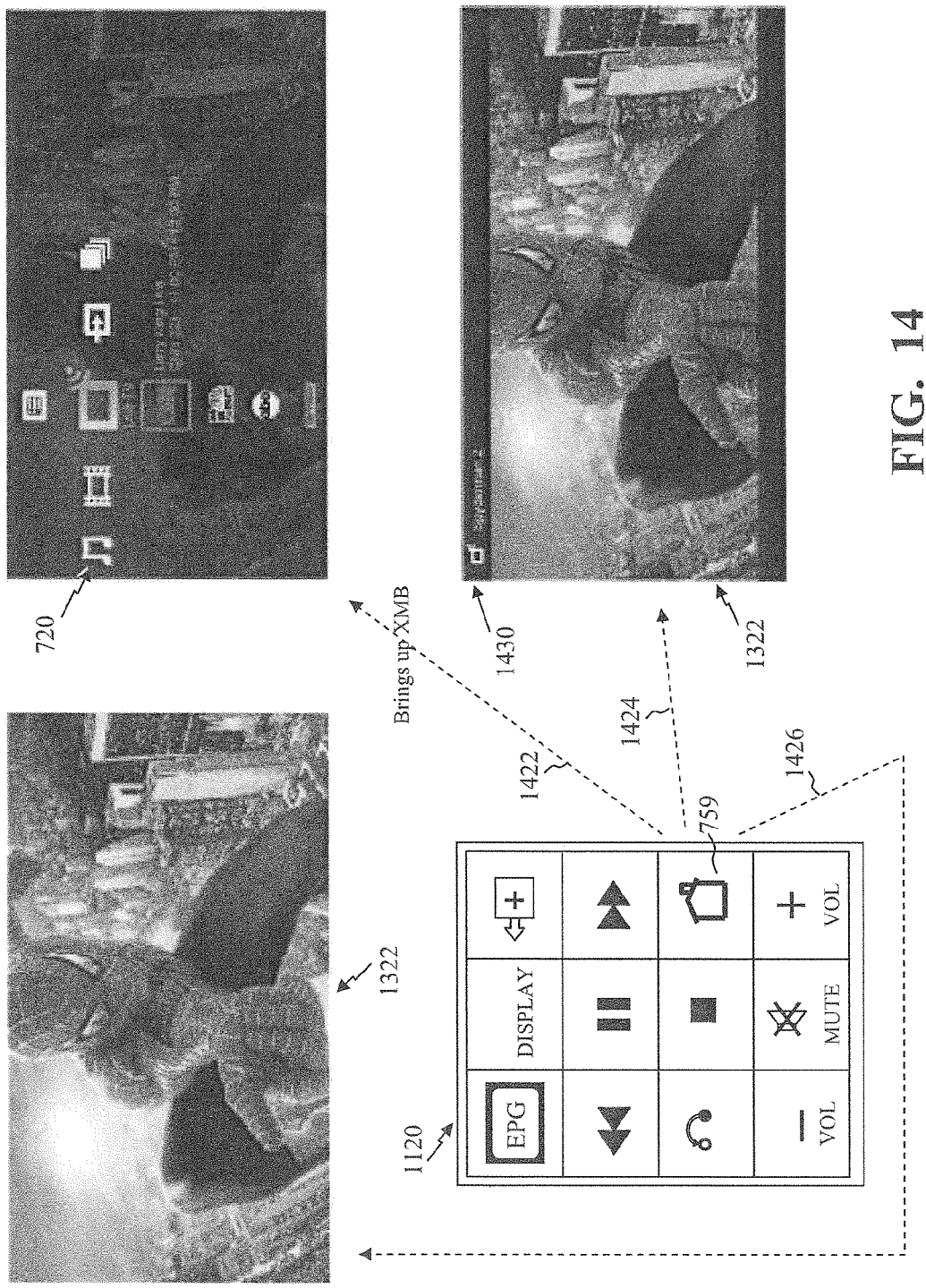
FIG. 14 depicts an example of a transition from displaying content to displaying of the menu of FIG. 7 upon an initial selection of a menu button displayed on the remote control.

FIG. 14 depicts an example of a transition from displaying content 1322 from a DVD player 324 on a TV 322 to the displaying of a GUI menu 720, such as a main menu, upon an initial selection 1422 of the menu function button 759 of the playback control view 1120 displayed on the touch screen 122 of the remote control 120. A subsequent selection 1424 of the menu button 759 can cause a further transition on the TV, for example, a transition from the main menu 720 to the displaying of the content 1322 with a title bar 1430. Additionally in some implementations, a still further subsequent selection 1426 of the menu button 759 can cause a transition back to the display of the content 1322 without the title bar 1430 or the menu 720.

A function button 130 can additionally be associated with the turning off of the TV, display or other consumer electronic device 321 being controlled. For example, the mute button 1142 can be used to forward a turn-off function signal to the server unit and/or consumer electronic device when a user presses or holds the displayed mute button 1142 for a predefined period of time (e.g., more than 1 seconds).

The remote control 120 is further capable of controlling one or more consumer electronic devices without the displaying of the main menu 720 on a TV, computer or other display. Further, the remote control 120, in some instances, can be used to activate and control multimedia and/or the playback of audio and/or music content without the need to view the main menu 720 or other menus on a remote display. In some embodiments, the powering down of a remote consumer electronic device or the holding of a function button can cause the remote control 120 to transition to a music playback control mode.

Figure 15:
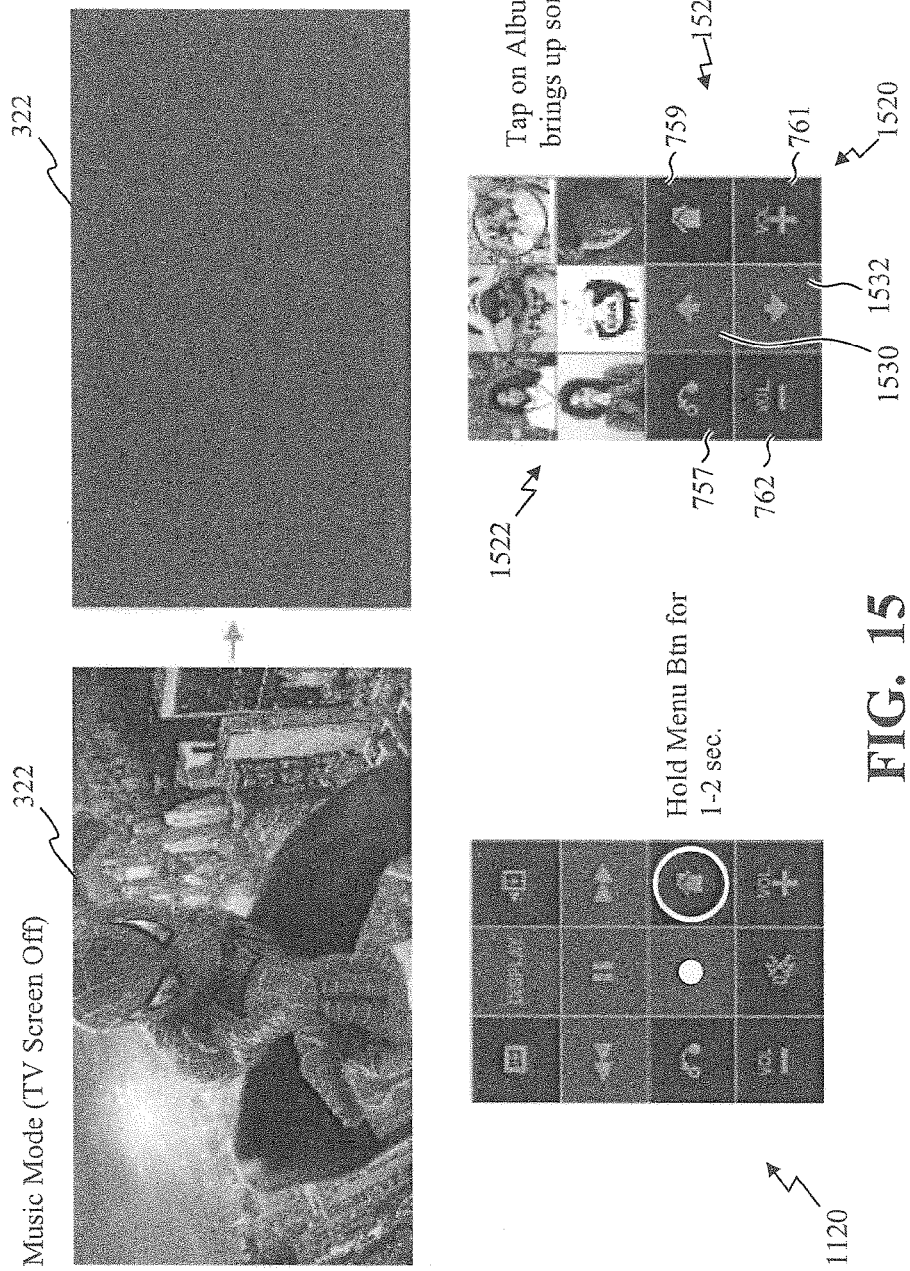
FIG. 15 depicts an example of a transition of control views on touch screen of the remote control of FIG. 1 from a menu control view to a multimedia control view with the fixed number of function buttons.

FIG. 15 depicts an example of a transition of control views 126 on the remote control touch screen 122 from a menu control view 722 to a multimedia control view 1520, such as music playback on a computer, CD player, an amplifier and/or receiver 326 or the like, with the fixed number of twelve (12) buttons. As introduced above, the multimedia control view 1520 can be a default control view upon the powering down of one or more consumer electronic devices. As a result, the multimedia control view 1520 can operate independent of an external display and/or without the cooperation with an external GUI menu or other device displaying a menu, options or the like, and instead allows a user to control multimedia playback using just the remote control. In some implementations, the multimedia control view 1520 can be activated through the selection of a function button, such as selecting a defined sequence of function buttons, pressing a function button for a predefined period of time, or other such activations. In some embodiments, the multimedia control view 1520 includes multimedia function buttons 1522 that are specifically associated with available multimedia. When controlling the playback of music, for example, the multimedia control view 1520 is a music control view. One or more of the function buttons are music function buttons 1522 that can be associated with a specific song, an album, a play list or other such organizations of available music. The selecting of one of these music function buttons 1522 causes the remote control to signal the server unit to activate an appropriate device (e.g., CD player, computer or the like) to begin playback of the associated music.

In some embodiments, the multimedia function buttons 1522 are displayed with graphical images, text and/or combinations thereof representing the associated music. For example, each multimedia function button 1522 can depict a "thumbnail" image of an album cover of the album associated with the multimedia function button. Typically, the multimedia control view 1520 limits the number of multimedia function buttons 1522 and the remainder of the fixed number of function buttons are control function buttons 1524, such as a back button 757, arrow buttons 1530, 1532, volume control buttons 761, 762, and a menu button 759.

The arrow buttons 1530, 1532 allows a user to scroll through the multimedia function buttons 1522 of available multimedia, playlists and/or collections. In some implementations, the multimedia control view 1520 is limited to include six multimedia function buttons 1522 of the fixed twelve function buttons. Upon the selection of one of the arrow buttons 1530, 1532, the remote control 120 forwards the scroll function signal to the server unit 330 which in turn identifies the currently represented music associated with the six displayed multimedia function buttons 1522; identifies a subsequent six songs, albums and/or playlists along with graphical representations for the subsequent six songs, albums and/or playlists; associates each of the graphical representations with one of the six multimedia function buttons 1522; and forwards display command signals back to the remote control 120. The remote control 120 then displays the subsequent six graphical representations of the additional songs, albums and/or playlists in the appropriate function button locations of the touch screen 122. In this way, a user can scroll through songs, albums and/or playlists (or other multimedia and/or groupings of multimedia) six at a time using the arrow buttons 1530, 1532.

A user can touch one of the displayed multimedia function buttons 1522 on the touch screen 122 to select and access the multimedia associated with the multimedia function button. In some instances when the selected multimedia function button is associated with a collection of multimedia, for example an album or playlist of more than one song, an additional multimedia listing control view 1620 is displayed.

Figure 16:
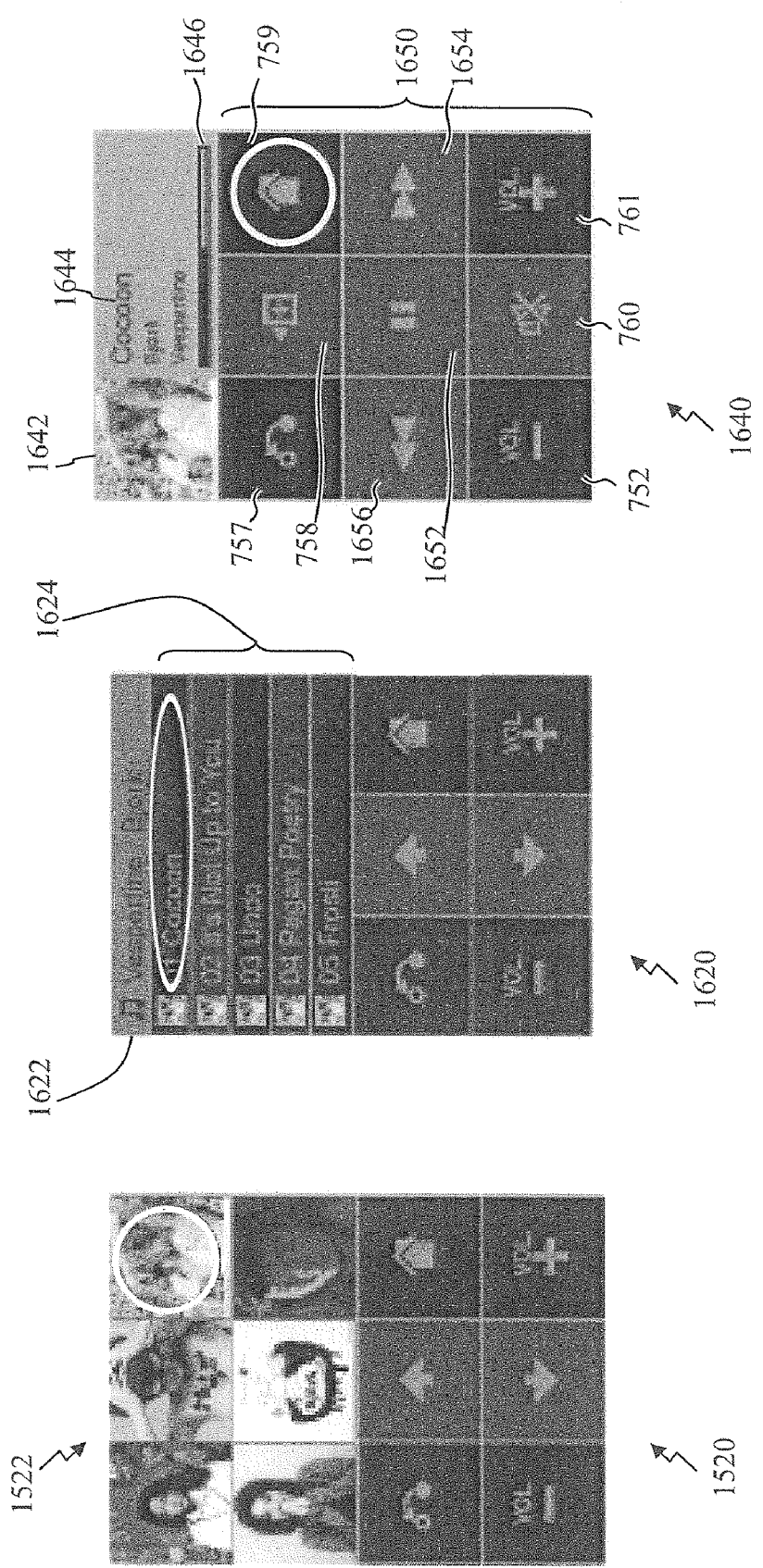
FIG. 16 depicts an example of a transition of control views displayed on the remote control touch screen to a multimedia listing control view and playback control view.

FIG. 16 depicts an example of a transition of control views 126 on the remote control touch screen 122 to a multimedia listing control view 1620 and playback control view 1640. Upon selection by a user of one of the multimedia function buttons 1522 the sever unit 330 can activate the playback of the associated multimedia and/or display the multimedia listing control view 1620. In some implementations, the initial selection of a multimedia function button causes the playback of content while the holding of a multimedia function button for a predefined period of time (or vice versa, or other activation) causes the server unit to determine whether multiple media content (e.g., a listing of songs) is associated with the selected multimedia function button. When there is a list associated with the selected multimedia button, the remote control is instructed to display a multimedia listing control view 1620 on the touch screen 122. Similar to the multimedia control view 1520, the multimedia listing control view 1620 includes the control function buttons 1524 and allows the user to access and/or control multimedia playback through the remote control 120 independent of an external GUI menu or other device displaying a menu, options or the like. The remainder of the touch screen 122 includes a title line 1622 for the collection selected through the multimedia control view 1520 and a listing 1624 of the songs or other multimedia of the collection. Again, the arrow buttons 1530, 1532 allow a user to scroll through the listing 1624. Upon identifying a desired song, a user can touch the screen 122 at the displayed desired song to activate the playback of that song.

In some embodiments, upon selection of one or more songs or collections of songs, a playback control view 1640 is displayed on the touch screen 122 of the remote control 120. The playback control view 1640 includes a current multimedia identification 1642 representative of, for example, the song selected through the multimedia listing control view 1620 and/or through other selections (such as the use of the main menu 720) and being played back, textual information 1644 about the song (e.g., the artist, the title of album, title of the song and other relevant information), and a time bar 1646 showing elapsed playback and time remaining. Control function buttons 1650 are further displayed on the touch screen 122 in the playback control view 1640. These control function buttons can include similar buttons as described above, such as a back button 757, options button 758, menu button 759, volume buttons 761, 762, a mute button 1142, a pause button 1652, a fast forward button 1654 and a rewind button 1656. The playback control view can, at least in the multimedia playback mode, allow control of multimedia playback independent of other displays and/or GUI menus.

The transition to the a multimedia control view 1520 can depend on the types of multimedia available, the consumer electronic devices capable of being controlled by the remote control 120, and other such factors. In some instances, a query control view is displayed prior to entering a specific multimedia control view (e.g., to control music playback) requesting a user to select the appropriate multimedia to be accessed. For example, the server unit 330 can detect a function signal to transition to the multimedia playback mode and can identify the types of multimedia capable of being accessed and played back, and can forward a control view with function buttons representative of the types of multimedia. The user can select one of the types of multimedia by touching the touch screen 122 at the appropriate function button.

In some embodiments as introduced above, the remote control 120 can allow a user to log in. A user log-in function button 760 can be displayed in some control views 126 that activate a log-in. The selection of the log-in function button can initiate a transition to a log-in control view.

Figure 17:
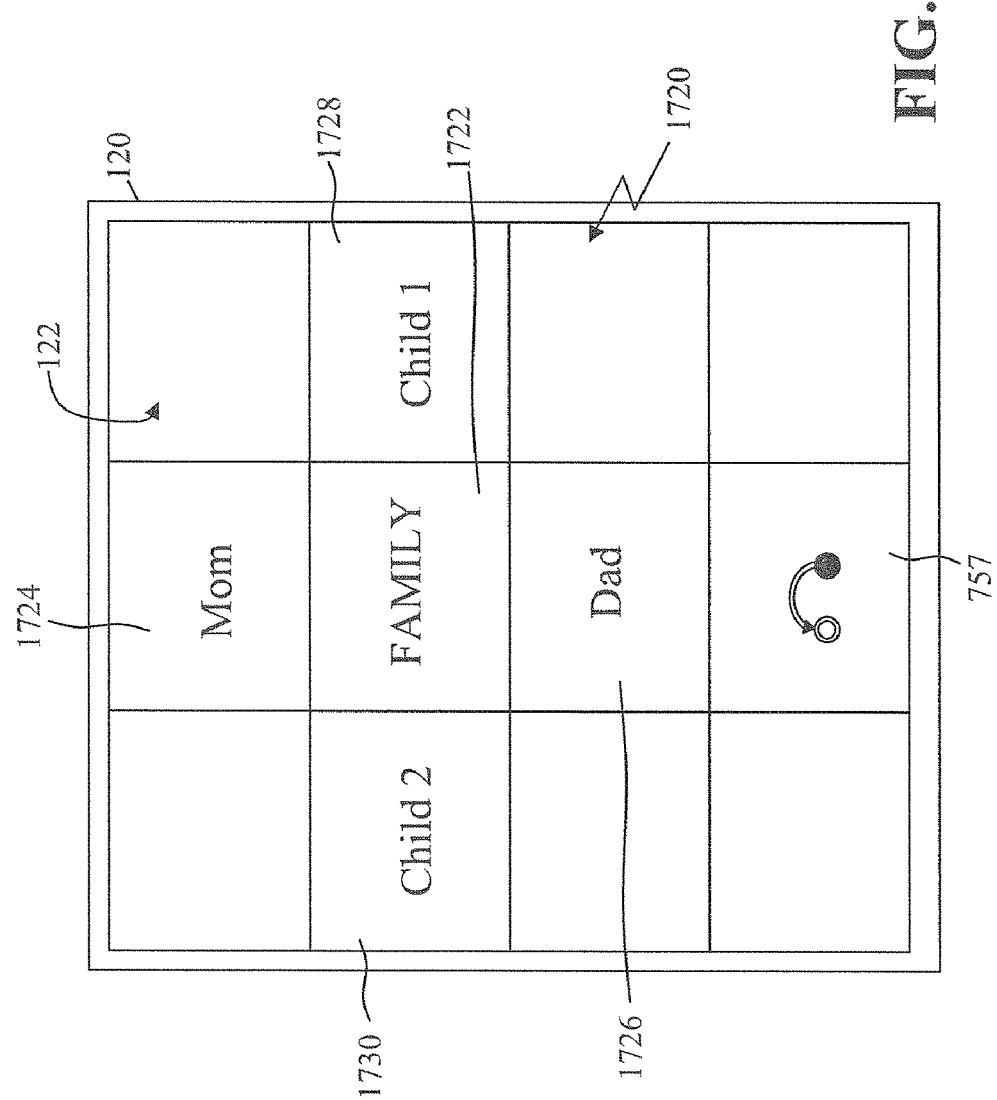
FIG. 17 depicts a simplified plane view of the remote control of FIG. 1 with a log-in control view displayed on the touch screen.

FIG. 17 depicts a simplified plane view of the remote control 120 with a log-in control view 1720 displayed on the touch screen 122. In some embodiments, some or all of the fixed number of log-in function buttons are assigned to a user. For example, the log-in control view 1720 can include a log-in function button for a "Family" user 1722, a "Mom" user 1724, a "Dad" user 1726, and one or more children users 1728, 1730. The log-in control view 1720 may additionally include other function buttons, such as a back button 757 or other such buttons. Typically, each user is defined through the server unit 330, a computer 342 or other consumer electronic device. In some embodiments, the log-in buttons can be displayed with graphics, text and/or other such imaging to distinguish one user from the other. For example, a picture of the family can be displayed for the "Family" user button 1722, and similarly pictures of Mom, Dad, and the children can be displayed at the log-in button. Substantially any number of users can be defined. In some implementations, where the number of users exceeds the fixed number of available function buttons 130 (in the example of FIG. 17, there are eleven function buttons available), one of the function buttons can be used as an "Other Users" function button than would cause a second log-in control view to be displayed with additional user log-in buttons.

The placement of the log-in buttons can be user defined, based on frequency of use or other such factors. In some embodiments following the selection of the user, a prompt is produced requesting the user to enter a code to verify the identity of the user. In such instances, the fixed number of function buttons can include numbers and/or letters to allow a user to enter the code. The settings or tools option 741, in some implementations, may be used to add, modify and/or delete users. User profiles associated with each user can be defined to allow configuration of system and/or remote control according to specific user preferences, such as favorite list(s), most recently used device, historical use data, and other such information.

Figure 18:
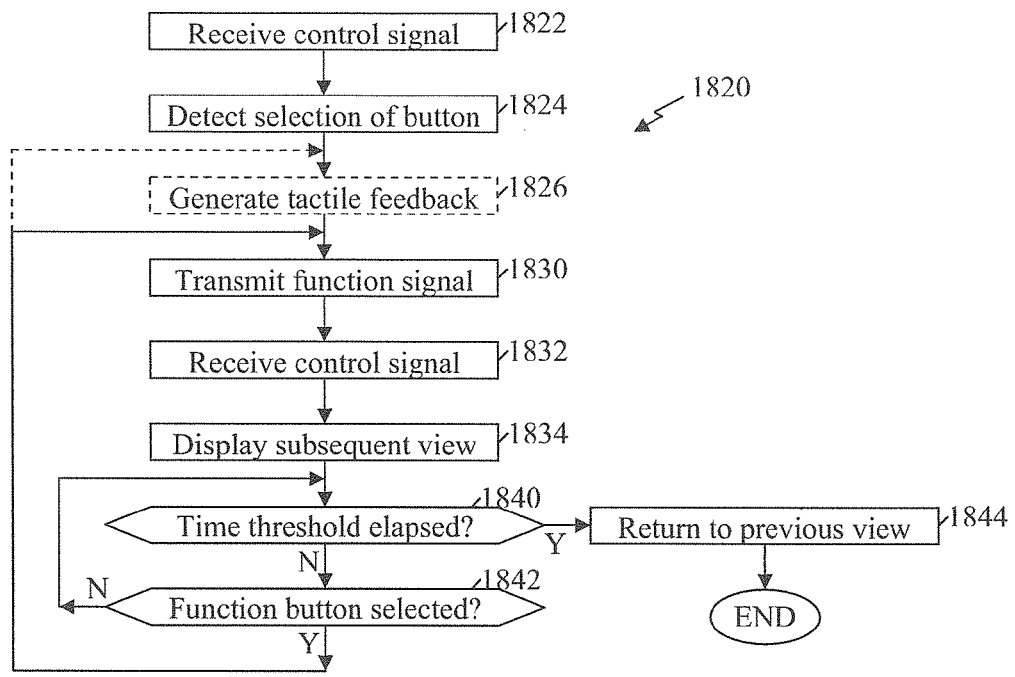
FIG. 18 depicts a simplified flow diagram of a process for use in implementing the remote control.

FIG. 18 depicts a simplified flow diagram of a process 1820 for use in implementing the remote control 120. In step 1822, a first control signal is received from the server unit to display a first control view, such as the menu control view 720. The first control view comprises the fixed number of function buttons to be displayed on the touch screen display with each function button being associated with one of a first plurality of control functions. In step 1824, a selection of one of the function buttons associated with a first control function is detected and/or identified. Some embodiments of the process 1820 include optional step 1826 where a tactile confirmation is generated in response to detecting the selection of the function button. The tactile confirmation, in some implementations, can be a small vibration that can be felt at about the area on the touch screen displaying the selected function button, is a vibration of the remote control 120, or other such tactile verifications.

In step 1830, the a function signal corresponding to the first control function associated with the selected one of the function buttons is wirelessly transmitted to the remote server unit 330 and/or consumer electronic device 321. In step 1832 a first control signal is wirelessly received from the server unit and/or consumer electronic device 321. The first control signal, in some implementations, can include a second control view mapping defining the locations of the function buttons within a subsequent control view. Additionally or alternatively, the first control signal can include a plurality of graphics, such as graphics related to songs, collections of songs or other multimedia content with each of the plurality of the graphics being associated with one of a plurality function buttons of a subsequent control view. In step 1834 the remote control 120 displays a subsequent control view on the touch screen display in response to the first control signal, with the second control view comprising the fixed number of function buttons with each function button of the second control view being associated with a second plurality of control functions where at least one of the second plurality of control functions is different than the first plurality of functions.

In step 1840, the process determines whether a time threshold period has elapsed since the detection of the selection of the function button and/or the displaying of the second control view. When the time period has not elapsed, the process continues to step 1842 to determine whether a function button has been selected. When a button has not been selected the process returns to step 1840. When a button has been selected the process returns to 1826 or 1830. When it is determined in step 1840 that the time threshold has elapsed, the process enters step 1844 where the remote control returns to the previous control view and ends.

Figure 19:
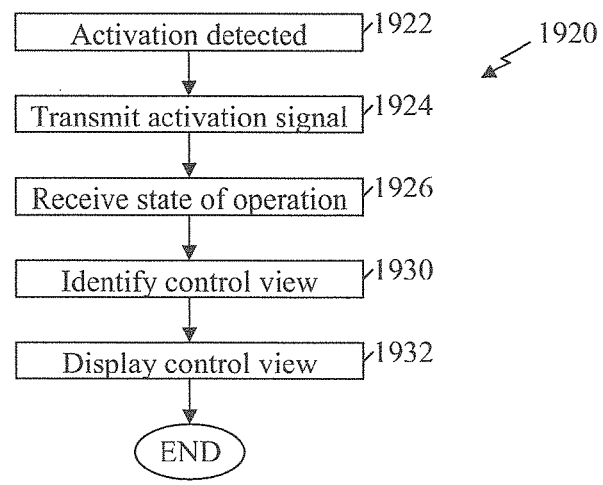
FIG. 19 depicts a simplified flow diagram of a process for use in activating the remote control of FIG. 1 according to some embodiments.

FIG. 19 depicts a simplified flow diagram of a process 1920 for use in activating the remote control 120 according to some embodiments. In step 1922, an activation of the remote control is detected. The activation typically is detected when a user touches the touch screen 122 of the remote control 120 when the remote control is in a sleep or off state (e.g., see FIG. 6). In step 1924, an activation function signal is wirelessly transmitted from the remote control 120 to the server unit 330 and/or the consumer electronic device to be controlled. In step 1926, a state of operation of the server unit, the consumer device to be controlled and/or the audio/video system 320 is received.

In step 1930, the controller 422 identifies a control view to be displayed associated with the state of operation of the server unit and/or device to be controlled. In some embodiments, the received state of operation includes designations of control functions to be associated with function buttons and the positioning of each function button within a control view. Additionally or alternatively, only some of the function buttons may be defined and the remote control 120 uses default function buttons for those not specifically defined by the server unit. In some embodiments, the state information can additionally include a control view mapping that defines the control view to be displayed for the identified state. Still further in some implementations, the remote control may locally store the control view mapping for later use upon receiving the same state of operation information. In step 1932, the display driver drives the touch screen to display the identified control view.

Figure 20:
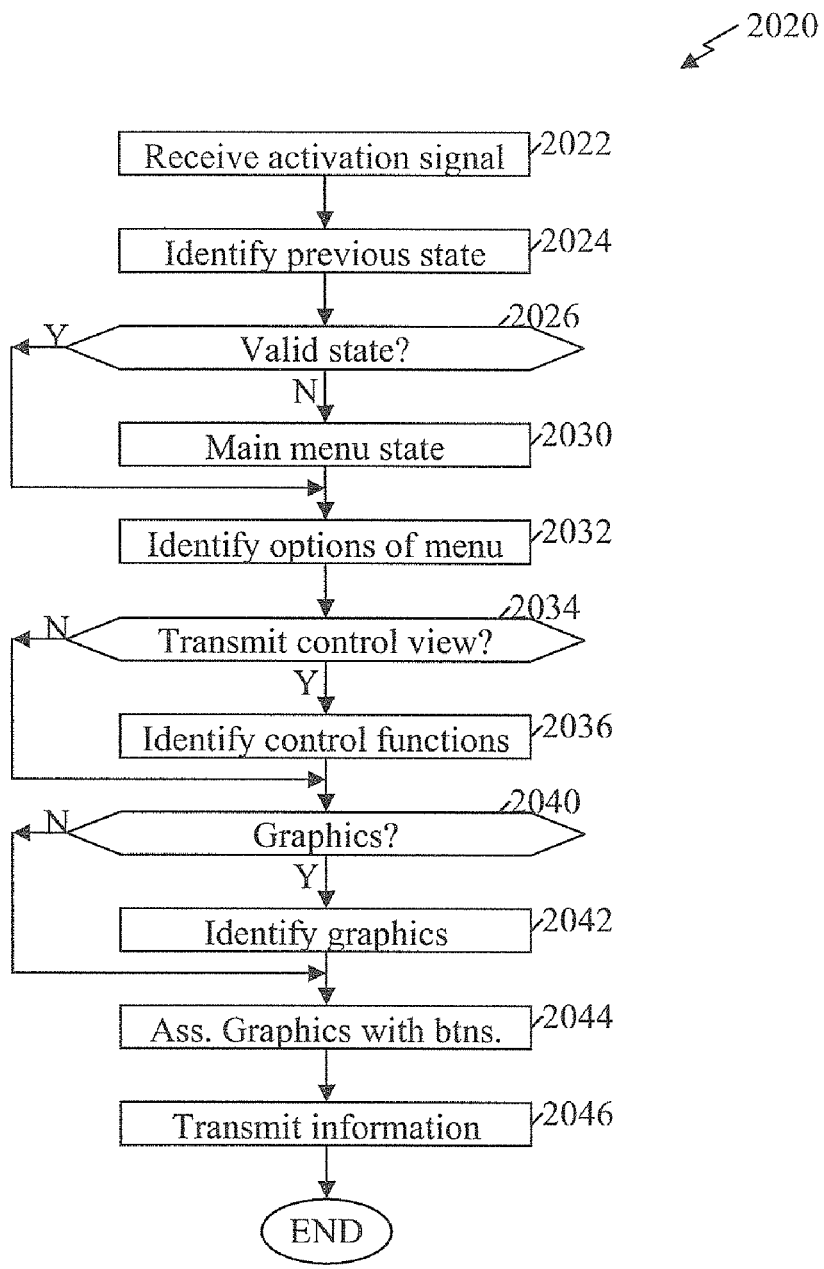
FIG. 20 depicts a simplified flow diagram of a process for use in remotely controlling a consumer electronic device through a remote control of FIG. 1.

FIG. 20 depicts a simplified flow diagram of a process 2020 for use in remotely controlling a consumer electronic device through a remote control 120. In step 2022, an activation signal is received at the server unit 330 from the remote control 120. In step 2024, the server unit identifies a previous state of operation of the device being controlled. In step 2026, it is determined whether the previous state of operation is a valid state. The state of operation may have expired, the content may no longer be available, or other such conditions may be such that the previous state is no longer valid. When the state is valid, the process skips to step 2032. Alternatively, step 2030 is entered. In step 2030, the server unit transitions to and/or directs the device being controlled to enter a main menu state of operation. As such, the main menu 720 can be displayed.

In step 2032, the server unit 330 identifies the options associated with the state of operation. In step 2034, it is determined whether a control view mapping of a control view and function buttons is to be transmitted. In some embodiments, the server unit 330 defines the control view and associates command functions with the function buttons, and forwards the control view mapping to the remote control device. In other instances, the remote control device locally stores control views, and based on a received state of operation can identify the locally stored control view to be displayed. The server unit, however, can forward control views to be stored replacing old stored control views, can forward updates for control views (e.g., only changing one or a few function buttons), and other reasoning for forwarding control view mapping. When the control view mapping is not to be transmitted, the process skips to step 2040.

In step 2036, the server unit 330 identifies the control functions and the placement of function buttons to be incorporated into a control view. In step 2040, it is determined whether graphics associated with multimedia content (e.g., songs, movies and the like) are to be transmitted to the remote control 120. When graphics are not to be transmitted, the process skips to 2044. Alternatively, step 2042 is entered where the multimedia content and the related graphics are identified. In step 2044, the server unit associates the related graphics with function buttons and identifies positioning of the function buttons relative to a control view. In step 2046, the sever unit transmits information to the remote control 120 to implement the displaying of the control view. The information can depend on the operation of the remote control, the locally stored content and/or control views and other factors. The information that is transmitted in step 2046 can include the state of operation, command functions when appropriate, content view mapping, graphics related with the identified multimedia content, and position of function buttons within the control view.

Figure 21:
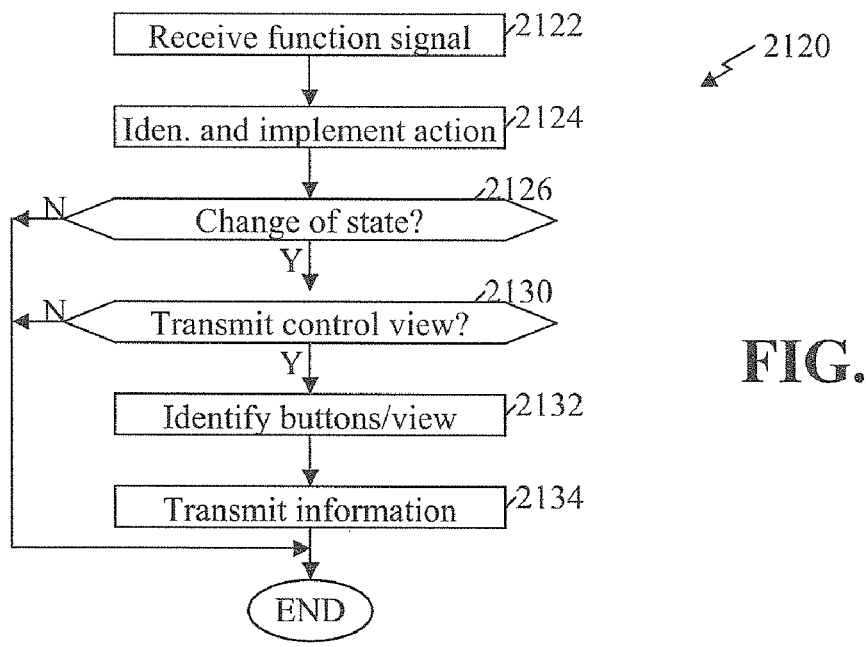
FIG. 21 depicts a simplified flow diagram of a process for use in implementing control of a remote device as received from a remote control device of FIG. 1.

FIG. 21 depicts a simplified flow diagram of a process 2120 for use in implementing control of a remote device as received from a remote control device 120. In step 2122, a function signal related to a selected function button is wirelessly received at the server unit 330 and/or consumer electronic device from the remote control 120. In step 2124, the server unit or device identifies one or more appropriate actions to be implemented based on the function signal and implements the action. For example, the function signal may instruct the selection of a highlighted TV channel icon such that the server unit causes a TV to change channels. Other such actions as are associated with remote control functions are similarly detected and implemented.

In step 2126, it is determined whether a state of operation of the consumer electronic device and/or the server unit has/have changed. When the state has not changed, the process 2120 terminates. Alternatively, in step 2130, it is determined whether control view mapping, graphics associated with multimedia content, and/or a control view are to be forwarded to the remote control device. When information is not to be transmitted the process 2120 terminates. Alternatively, step 2132 is entered where the server unit 330 identifies function buttons, command functions, graphics associated with multimedia content, and/or a control view to be forwarded to the remote control device. The control view may be notifying of the change of less than all of the function buttons or can be a complete control view. In step 2134, the server unit transmits changed/current state of operation, graphics, control view mapping and other relevant information. In some embodiments, the remote control device locally stores control views, and based on the received change in state of operation, the remote control device identifies an appropriate control view and displays the appropriate control view related to the current state of operation.

Figure 22:
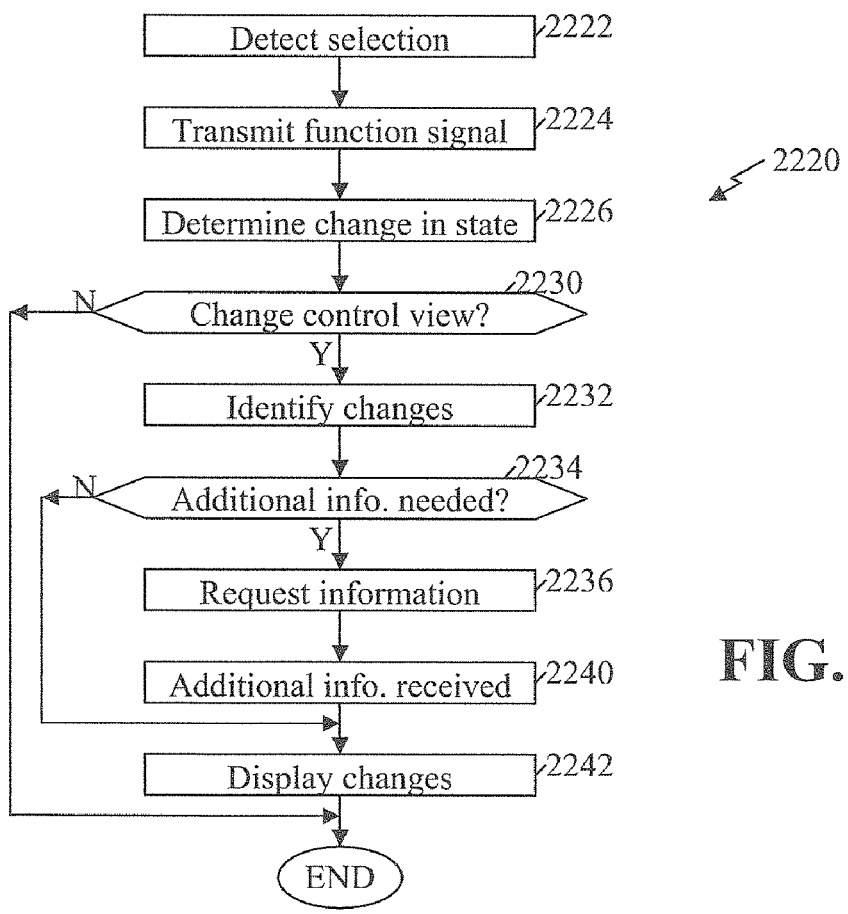
FIG. 22 depicts a simplified flow diagram of a process for use in locally updating and/or changing control views displayed through the touch screen of the remote control of FIG. 1 based on selections of displayed function buttons.

In some embodiments, at least some of the changes in state of operation of a device being controlled can be detected at the remote control. FIG. 22 depicts a simplified flow diagram of a process 2220 for use in locally updating and/or changing control views displayed through the touch screen 122 based on selections of displayed function buttons. In step 2222, a selection of a function button on a control view is detected. In step 2224, the remote control 120 transmits a selection function signal to the server unit. In step 2226, the remote control determines a change in state of the system and/or device being controlled based on the selected function button. The determination can be made based on a look up table, or other such association of button selections relative to states of operation when the function button is selected. In step 2230, it is determined whether one or more function buttons are to be changed based on the changed state. When no function buttons are to be changed, the process terminates. Alternatively, in step 2232, the process identifies the function buttons that are to change or identifying a control view associated with changed state. In step 2234, it is determined whether addition information, control view mapping, graphics and/or other information is/are needed to display the appropriate control view. When further information is needed, step 2236 is entered where information is requested. In step 2240, additional information is received from the sever unit 330. In step 2242, the display driver implements the changes to the control view and/or generates a new control view to be displayed on the touch screen based on local data and/or the information received in response to the request of step 2236.

Figure 23:
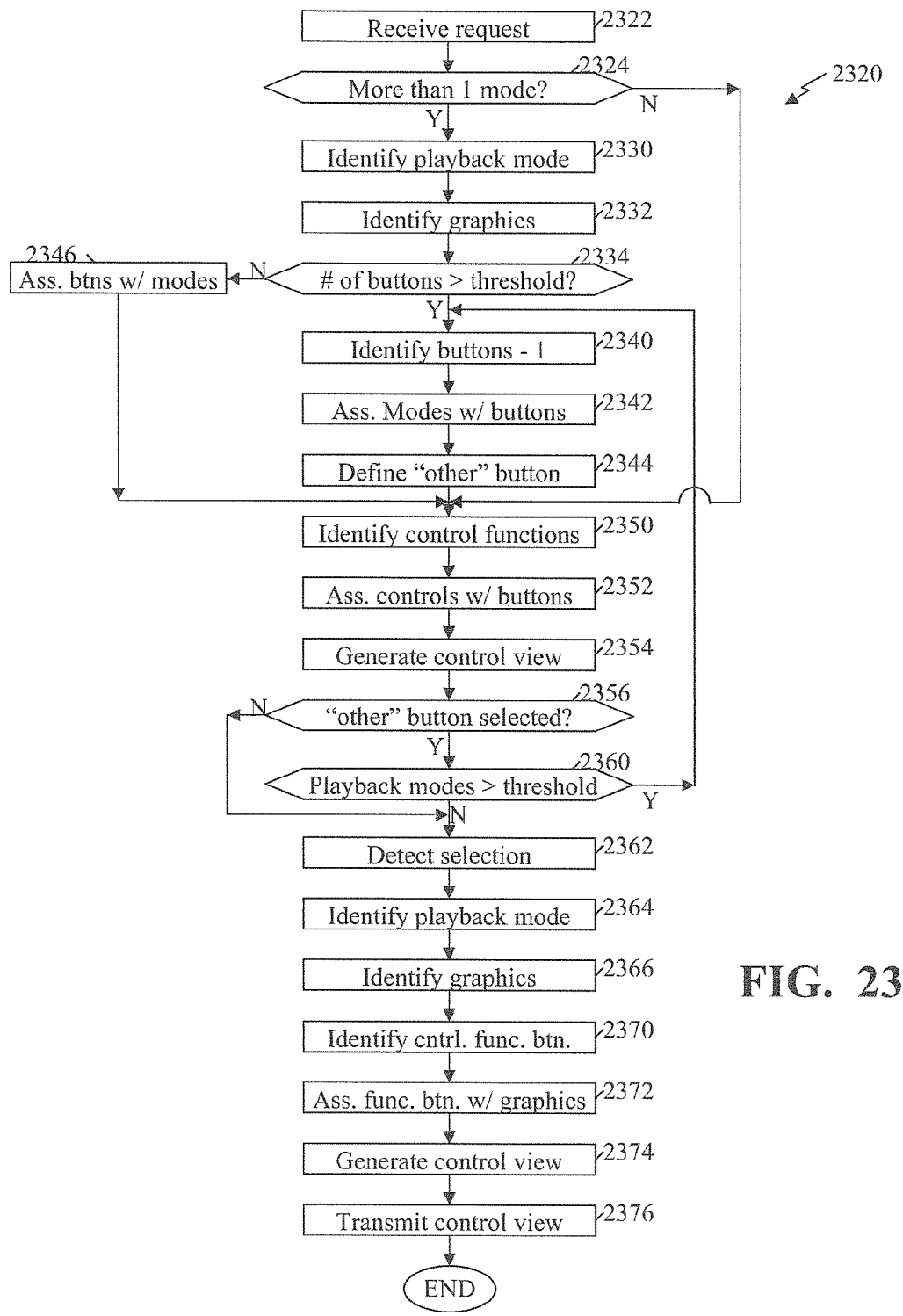
FIG. 23 depicts a simplified block diagram of a process for use in transitioning to a multimedia playback mode.

FIG. 23 depicts a simplified block diagram of a process 2320 for use in transitioning to a multimedia playback mode. The multimedia playback mode allows a user to control access to and/or playback of multimedia content directly through the remote control and independent of other devices or displays. In step 2322, a request to transition to the multimedia playback mode is received. In step 2324, it is determined whether there is more than one multimedia playback mode. For example, the multimedia playback modes may include music playback, movie playback, picture playback or other such multimedia playback. When there is only a single multimedia playback mode, the process skips to step 2350.

Alternatively when there is more than one multimedia playback mode, the process enters step 2330 to identify each of the plurality of available multimedia playback modes. In step 2332, graphics associated with each of the plurality of multimedia playback modes are identified. The graphics can include a picture, image, text, and other such graphics and/or combinations thereof. In step 2334, the process 2320 identifies function buttons to be displayed with the multimedia buttons and determines whether the number of multimedia playback modes exceeds the fixed number of function buttons of the remote control minus the number of function buttons (e.g., 12 fixed function buttons minus one back button 757, allows for 11 multimedia function buttons). When the number of multimedia buttons exceeds the threshold (e.g., exceeds 11), step 2340 is entered to identify the threshold minus one highest priority multimedia playback modes. In step 2342, a plurality of function buttons are associated with each of the identified highest priority multimedia playback modes. In step 2344, an additional "others" function button is defined. Alternatively when the number of multimedia buttons does not exceeds the threshold, step 2346 is entered where a plurality of function buttons are associated with each of the available multimedia playback modes.

In step 2350, a plurality of control functions to be displayed are identified. In step 2352, one or more of function buttons are with each of the identified control functions. These can include, for example, arrow function buttons 752-755, enter function button 756 and the like to allow selection of one of the multimedia playback mode function button. In step 2354, a control view is generated including the associated function buttons associated with the multimedia playback modes, the "others" function button when appropriate, and the control function buttons.

In step 2356, the process determines whether the "others" function button was selected. When the "other" function button is selected, step 2360 is entered to determine whether the remaining number of multimedia playback modes exceeds the threshold number as described above with respect to step 2334. When the remaining number multimedia playback modes exceed the threshold the process 2320 returns to step 2340 to identify the next set of highest priority of multimedia playback modes. Alternatively, step 2362 is entered to detect a selection of one of the multimedia playback modes.

In step 2364, multimedia content associated with the one or selected multimedia playback mode is identified. The content can be defined by user's favorites, most recently played back content, most often accessed content, user defined, or other such factors. In step 2366, graphics associated with identified multimedia content are identified. Again, the graphics can include textual, picture, and/or other graphics. In step 2370, control function buttons to be displayed are identified. In step 2372, function buttons 130 are associated with each of the identified multimedia content and graphics, and the plurality of control functions. In step 2374, a control view is generated with the fixed number of function buttons that includes a first plurality function buttons depicting the identified graphics for the identified multimedia content and a second plurality of function buttons each being associated with one of the identified control functions. In step 2376, the control view is forwarded to the remote control 120 and/or displayed on the touch screen 122 of the remote control 120. As introduced above, the multimedia playback mode(s) allow a user to gain access and/or playback multimedia through the control views displayed on the remote control 120 without the need for other menus or options being displayed on a separate display.

Figure 24:
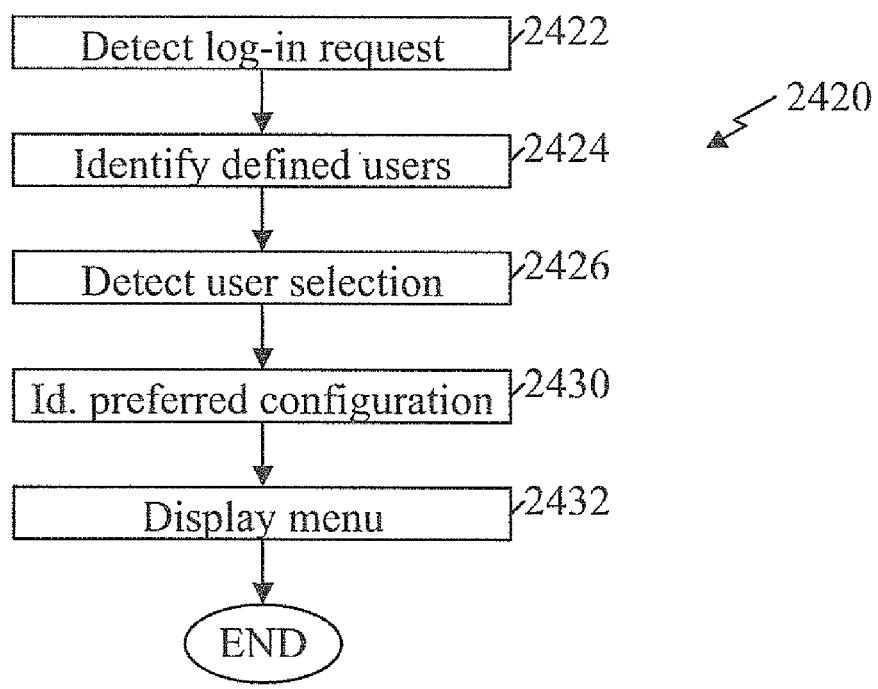
FIG. 24 depicts a simplified flow diagram of a process for use in generating and displaying a user log-in control view.

FIG. 24 depicts a simplified flow diagram of a process 2420 for use in generating and displaying a user log-in control view 1720. In step 2422, a request for a user to log-in is detected. In some embodiments, this may include the detection of the selection of a user function or log-in button 760. In step 2424, the defined users are identified and displayed (e.g., see FIG. 17). In step 2426, a selection of a user is detected. In step 2430, the process 2420 identifies preferred system and remote control configurations for the selected user. This can include identifying a user's favorite listings, retrieving identified user's history, and other defined settings. In step 2432, the main menu 720 is displayed.

Figure 25:
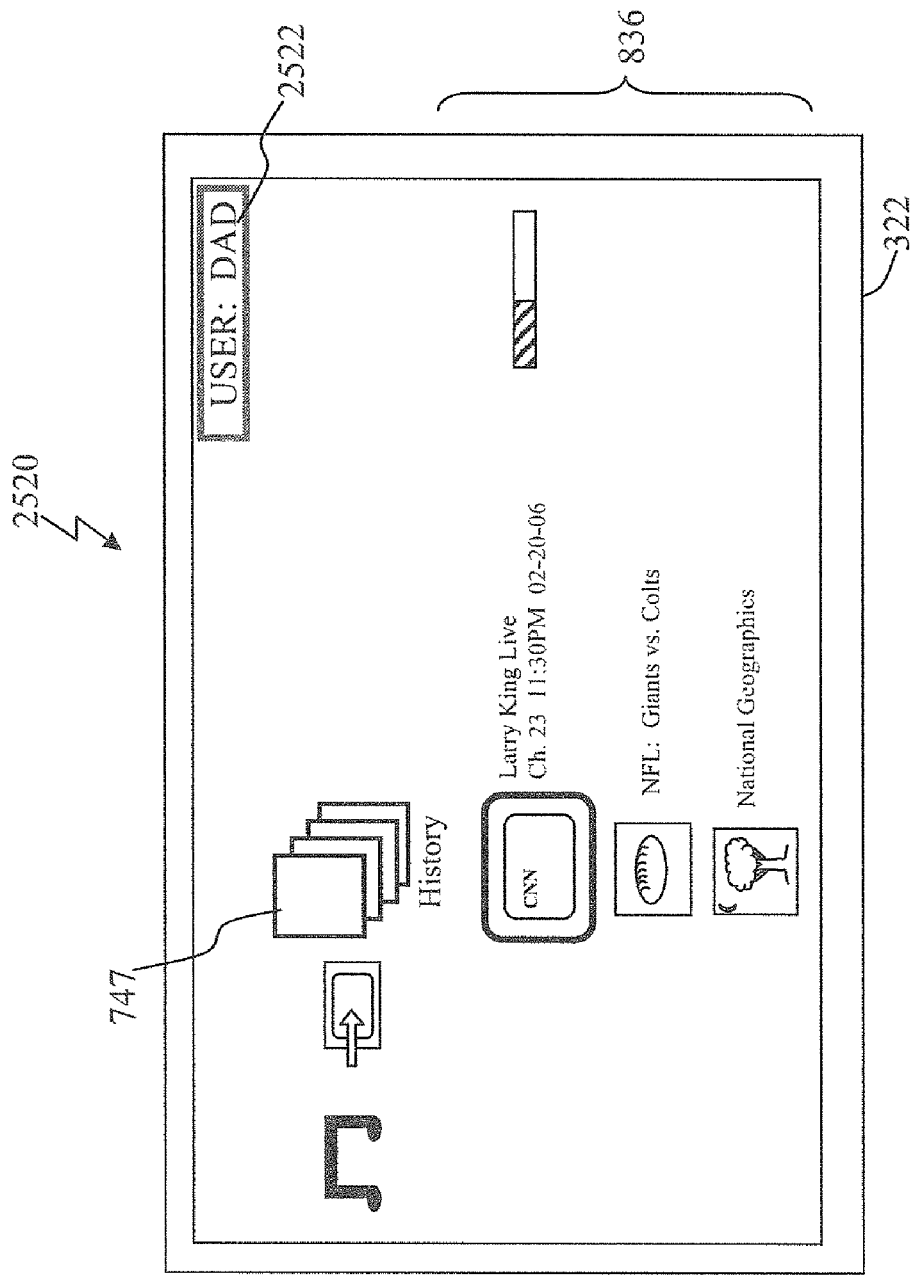
FIG. 25 depicts a simplified block diagram of a TV or other display showing a user based GUI menu based on a logged-in user.

FIG. 25 depicts a simplified block diagram of a TV or other display 322 showing a user based GUI menu 2520 based on a logged-in user (e.g., "Dad" user). The user logged-in menu 2520 identifies the user 2522 and is configured based on user's preferences, settings, history and other parameters. For example, the menu 2520 displays the GUI menu with the history icon 747 highlighted and showing sub-icons 836 of the most recently access media, such as most recent TV programs viewed by the logged in user (e.g., "Dad" user).

The remote control 120 simplifies the use of the remote control, in part by limiting the number of buttons a user has to identify and navigate through to a predefined fixed number. The use of the remote control 120 is further simplified by altering the functions associated with the predefined fixed number of displayed function buttons depending on the state of the system 320, the server unit 330, the consumer electronic device being control and/or the remote control 120. In some embodiments, the number of function buttons is limited to twelve (12) function buttons that vary depending on the state of operation. The touch screen tactile cover 222 further protects the touch screen 122 while providing a user with tactile feedback for use of the remote control. Additionally, the displaying of the function buttons 130 on the touch screen 122 allows the remote control 120 to control any number of different consumer electronic devices.

As introduced above with some embodiments, the server unit 330 can determine the consumer electronic device to be control based on the proximity of the consumer electronic devices to the remote control 120 during use. Upon selection of the type of consumer electronic device to be operated (e.g., TV, stereo, DVD player and the like), the server unit, in some implementations, identifies the selected type of device that is closest to the remote control 120 at the time of selection. Additionally and/or alternatively, the server unit can identify and have the remote control display on the touch screen 122 two or more consumer electronic devices allowing the user to select the desired consumer electronic device to control.

While the invention herein disclosed has been described by means of specific embodiments and applications thereof, numerous modifications and variations could be made thereto by those skilled in the art without departing from the scope of the invention set forth in the claims.

What is claimed is:

1. A remote control system, comprising:
   a processor;
   a touch screen display cooperated with the processor, where the touch screen display is configured to display a first control view of a plurality of control views, with a fixed number of function buttons displayed in each of the plurality of control views;
   a wireless transmitter coupled with the processor, where the wireless transmitter is configured to wirelessly transmit at least one function signal to a remote multimedia playback device that is separate from the remote control system, where the at least one function signal is configured to control an operation of the remote multimedia playback device;
   wherein the processor is configured to identify a change in a state of operation of the remote multimedia playback device and cause the touch screen display to display a second control view of the plurality of control views based on the identified change in the state of operation of the remote multimedia playback device such that the second control view includes the fixed number of function buttons, where control functions associated with one or more of the function buttons displayed in the second control view are different than control functions associated with one or more of the function buttons displayed in the first control view; and
   a wireless receiver coupled with the processor, where the wireless receiver is configured to wirelessly receive a control signal from the remote multimedia playback device in response to the remote multimedia playback device receiving the function signal, and where the control signal defines a current state of operation of the remote multimedia playback device being controlled in accordance with the function signal to implement one or more functions corresponding to the selected one of the function buttons;
   wherein the processor is configured to:
      identify, from the control signal wirelessly received from the remote multimedia playback device, the change in the state of operation of the remote multimedia playback device in response to the function signal; and
      cause the touch screen to display the second control view of the plurality of control views based on the change in the state of operation and the current state of operation of the remote multimedia playback device such that the second control view includes the fixed number of function buttons.

2. The system of claim 1, wherein the wireless receiver is further configured to wirelessly receive, in response to a selection of a function button identifying a type of the remote multimedia playback device to control, a listing of two or more available remote multimedia playback devices corresponding to the selected type of the remote multimedia playback device that can implement function commands wirelessly transmitted from the wireless transmitter when two or more remote multimedia playback devices of the selected device type are available and can implement the function commands; and
   the touch screen display is configured to display the listing of the two or more available remote multimedia playback devices and the processor is configured to receive a selection of one of the two or more available remote multimedia playback devices such that the function command is directed to the one of the two or more available remote multimedia playback devices.

3. The system of claim 1, wherein the fixed number of function buttons in the first control view of the plurality of control views comprises a first set of directional controls to cause a plurality of icons of a menu displayed on a remote display to scroll across the remote display in response to successive selections of one or more of the first set of directional controls.

4. The system of claim 1, wherein each of a subset of the fixed number of function buttons displayed in the second control view is associated with one of a plurality of different selectable multimedia contents.

5. The system of claim 4, wherein the touch screen display receives at least one alternate display control signal such that the touch screen display displays an alternate control view comprising a number of function buttons that is different than the fixed number of function buttons including a listing of multimedia content associated with one of the plurality of different selectable multimedia content.

6. The system of claim 1, wherein the control signal comprises the second control view such that the processor extracts the second control view from the control signal and displays the second control view.

7. The system of claim 6, wherein the second control view is a replacement to a previous second control view locally stored such that the processor locally stores the second control view to be used in place of the previous second control view in subsequent instances where the previous second control view would have been displayed.

8. The system of claim 1, wherein the processor in causing the touch screen to display the first control view is further configured to cause the touch screen to display the first control view without locally playing back multimedia content on the touch screen display; and
   the processor in causing the touch screen to display the second control view is further configured to cause the touch screen to display the second control view without locally playing back multimedia content on the touch screen display.

9. The system of claim 8, wherein the processor in causing the touch screen to display the first and second control views causes the touch screen to only display the first and second control views and without locally playing back multimedia content.

10. A method for use in providing control over remote devices, comprising:
   displaying, locally at a remote control device, a first control view comprising a fixed number of function buttons on a touch screen display with each function button being associated with one of a first plurality of control functions;

identifying a selection of one of the function buttons associated with a first control function;

wirelessly transmitting, to a remote multimedia playback device being controlled by the remote control device, a first function signal corresponding to the selected one of the function buttons;

wirelessly receiving, in response to the first function signal and from the remote multimedia playback device, a first control signal where the first control signal defines a current state of operation of the remote multimedia playback device being controlled in accordance with the first function signal to implement one or more functions corresponding to the selected one of the function buttons; and displaying a second control view on the touch screen display in response to the first control signal and based on the current state of operation of the remote multimedia playback device, wherein the second control view comprises the fixed number of function buttons with each function button of the second control view being associated with a second plurality of control functions where a plurality of the second plurality of control functions are different than the first plurality of control functions.

11. The method of claim 10, further comprising:
identifying when a time threshold period has elapsed following the identifying the selection of the function button and none of at least a subset of the function buttons of the second control view are selected; and
displaying the first control view comprising the fixed number of function buttons on the touch screen display when the time threshold has elapsed and none of the subset of the function buttons of the second control view are selected.

12. The method of claim 10, wherein the first control signal comprises a second control view mapping defining a plurality of locations of the function buttons within the second control view.

13. The method of claim 10, wherein the first control signal comprises a plurality of graphics relating to a plurality of different multimedia content with each of the plurality of the graphics being associated with one of a plurality of function buttons of the second control view, and where each of the plurality of graphics is a different graphic and depicts an image representative of a corresponding one of the plurality of different multimedia content.

14. The method of claim 10, wherein the displaying the second control view comprises:
identifying, from the first control signal, a change in a state of operation of the remote multimedia playback device based on the current state and in response to the function signal; and
identifying, in response to identifying the change in the state of operation of the remote multimedia playback device, the second control view corresponding to the current state of operation of the remote multimedia playback device.

15. The method of claim 14, wherein the displaying the first control view comprises displaying the first control view without locally playing back multimedia content on the touch screen display, and the displaying the second control view comprises displaying the second control view without locally playing back multimedia content on the touch screen display.

16. The method of claim 14, wherein the first control signal comprises the second control view such that identifying the second control view comprises extracting the second control view from the first control signal and the displaying the second control view comprises displaying the second control view extracted from the first control signal.

17. The method of claim 10, further comprising:
identifying that the first control signal includes an updated portion to the second control view;
extracting the updated portion of the second control view from the first control signal; and
replacing within a stored second control view a portion of the stored second control view with the updated portion of the second control view;
wherein the displaying the second control view comprises displaying the second control view comprising the updated portion.

18. An apparatus for use in remotely controlling devices, comprising:
means for displaying, locally at a remote control device, a first control view comprising a fixed number of function buttons on a touch screen display with each function button being associated with one of a first plurality of control functions;
means for identifying a selection of one of the function buttons associated with a first control function;
means for wirelessly transmitting, to a remote multimedia playback device, a first function signal corresponding to the selected one of the function buttons;
means for wirelessly receiving, in response to the first function signal and from the remote multimedia playback device, a first control signal defining a current state of operation of a remote multimedia playback device as a result of the remote multimedia playback device implementing the first function; and
means for displaying a second control view on the touch screen display in response to the first control signal and based on the current state of operation of the remote multimedia playback device, wherein the second control view comprises the fixed number of function buttons with each function button of the second control view being associated with a second plurality of control functions where a plurality of the second plurality of control functions are different than the first plurality of control functions.

19. The apparatus of claim 18, further comprising:
a tactile screen cover extending over and covering the touch screen display through which the means for identifying the selection can detect the selections of one or more of the function buttons.

20. The apparatus of claim 19, wherein the tactile screen cover comprises contouring corresponding with boundaries of each of the fixed number of function buttons.

* * * * *

UNITED STATES PATENT AND TRADEMARK OFFICE
CERTIFICATE OF CORRECTION

PATENT NO. : 8,384,672 B2
APPLICATION NO. : 13/285360
DATED : February 26, 2013
INVENTOR(S) : Sakai et al.

Page 1 of 1

It is certified that error appears in the above-identified patent and that said Letters Patent is hereby corrected as shown below:

In the Claims

Claim 1, column 21, line 55, delete "buttons;" and insert --buttons,--.

Signed and Sealed this
Sixth Day of August, 2013

Teresa Stanek Rea
*Acting Director of the United States Patent and Trademark Office*